United States Patent
Shen et al.

(10) Patent No.: US 8,773,279 B2
(45) Date of Patent: Jul. 8, 2014

(54) APPARATUS FOR VISUALLY AND REMOTELY DETERMINING AN ANGULAR POSITION OF A RELATIVE ROTATION OF PARTS

(76) Inventors: Jinghua Shen, Hamilton, NJ (US); Jingrong Shen, Hamilton, NJ (US)

( * ) Notice: Subject to any disclaimer, the term of this patent is extended or adjusted under 35 U.S.C. 154(b) by 508 days.

(21) Appl. No.: 13/205,165

(22) Filed: Aug. 8, 2011

(65) Prior Publication Data

US 2013/0038466 A1    Feb. 14, 2013

(51) Int. Cl.
*G08B 23/00* (2006.01)
*G08C 19/00* (2006.01)
*G06F 15/00* (2006.01)

(52) U.S. Cl.
CPC ................ *G06F 15/00* (2013.01); *G08C 19/00* (2013.01)
USPC ............ 340/870.02; 340/870.3; 340/870.37; 340/572.1; 340/572.4; 340/572.8; 324/660; 324/683; 702/45; 702/150; 702/151

(58) Field of Classification Search
CPC .................. G01F 11/00; G08C 19/00
USPC ................ 340/870.02, 870.3, 870.37; 340/571.1–572.8; 702/45, 150, 151; 324/660, 683
See application file for complete search history.

(56) References Cited

U.S. PATENT DOCUMENTS 7,656,649 B2 *  2/2010  Loy et al. ............... 361/659
8,129,985 B2 *  3/2012  Lee et al. ............... 324/207.25

* cited by examiner

Primary Examiner — Tai T Nguyen

(57) ABSTRACT

A visually and remotely readable apparatus is provided which comprises a plurality of sensing units, a control unit and a flexible printed cable (FPC) to connect two units for exchanging information therebetween. A preferable structure of the sensing unit includes a fixed part secured to the body of the apparatus and two oppositely positioned rotatable parts, where two rotatable parts mounted on a common shaft with the fixed part arranged therebetween forming two angular position sensors. Each sensor is based on the capacitive coupling between two working surfaces of the rotatable part and the respective working surfaces of the fixed part with the electrodes are secured thereto. Two working surfaces of one part are confronted with two respective working surfaces of another part forming two working surface pair. Each sensor has two working surface pairs, one working surface pair is sensing pair for sensing angular position; another is coupling pair for coupling sensing signals. A plurality of transmitting electrodes are secured to the working surface of the sensing pair of the fixed part; a receiving electrode is secured to the working surface of the sensing pair of the rotatable part; an output electrodes is secured to the working surface of the coupling pair of the fixed part; a coupling electrode connected to the receiving electrode is secured to the working surface of the coupling pair of the rotatable part. To each of the plurality of the transmitting electrodes is applied a respective one of polyphase squarewave voltages. The capacitive coupling between the electrodes of the sensing pair is dependent on the relative positions of two rotatable part, and the output signal voltages on the output electrode which coupled from the coupling electrode represents the angular position of the rotatable part. In the first embodiment provided for the sensors, the shape of working surfaces is in a conical frustum; the second embodiment, the shape of working surfaces is a cylinder; the third embodiment, the shape of working surfaces is a disc; the fourth embodiment, with a cylinder-shaped working surface and a disk-shaped working surface, is a combination of the second and the third embodiments provided as an example of the application of the embodiments. A circuit of the control unit is provided for processing data, generating control signals for the sensors. By using radio frequency identification (RFID) technique to exchange information with the reader station outside of the apparatus and power the system are also disclosed in the invention.

26 Claims, 23 Drawing Sheets

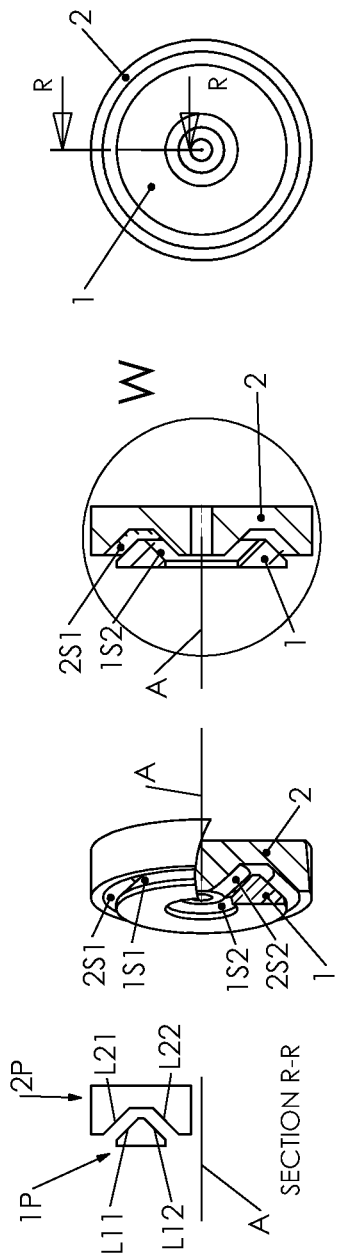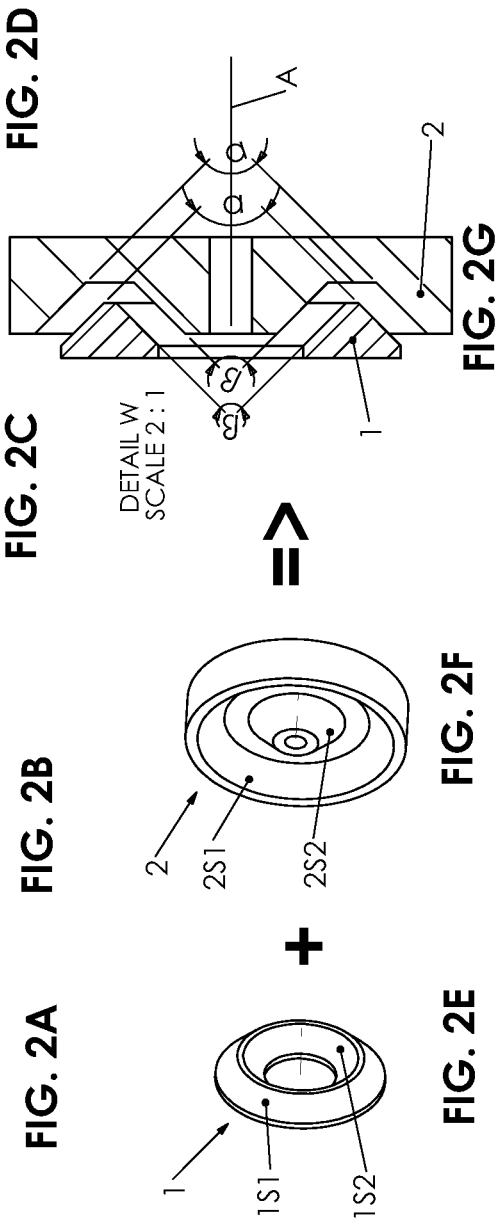

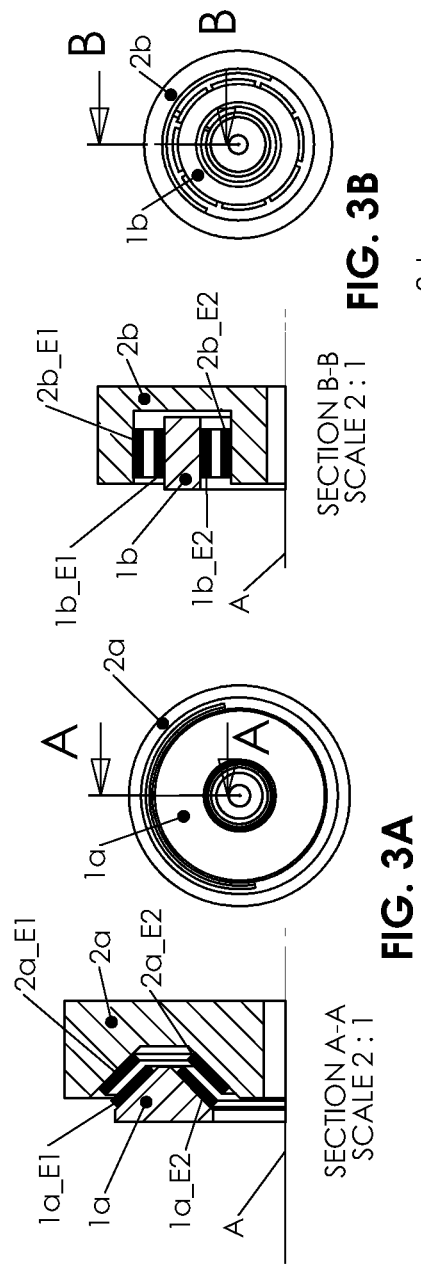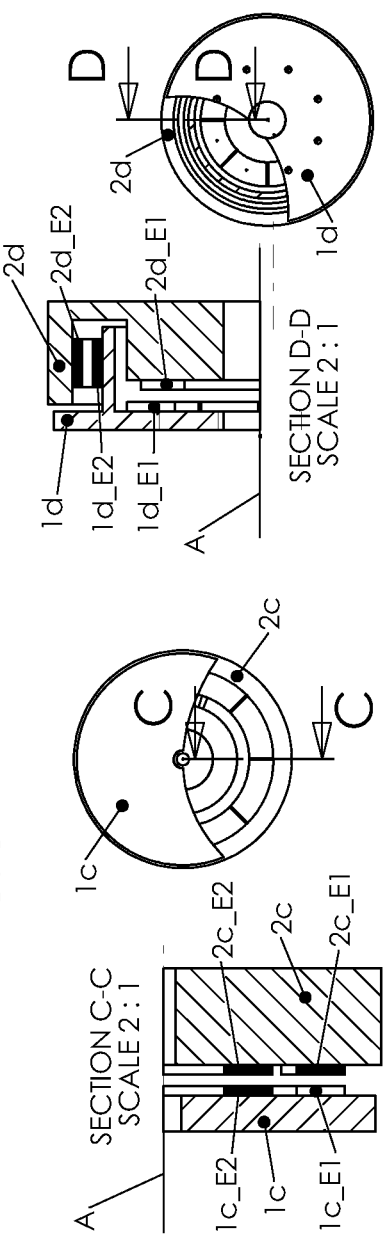
FIG. 3A  FIG. 3B  FIG. 3C  FIG. 3D

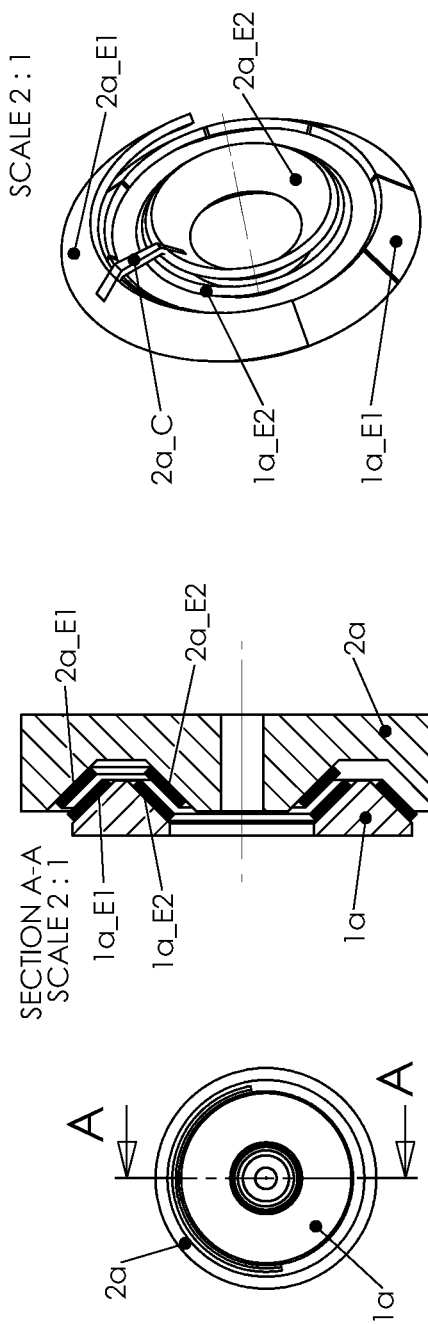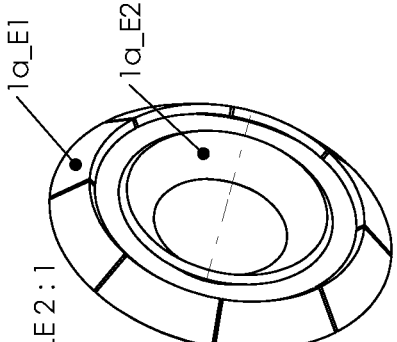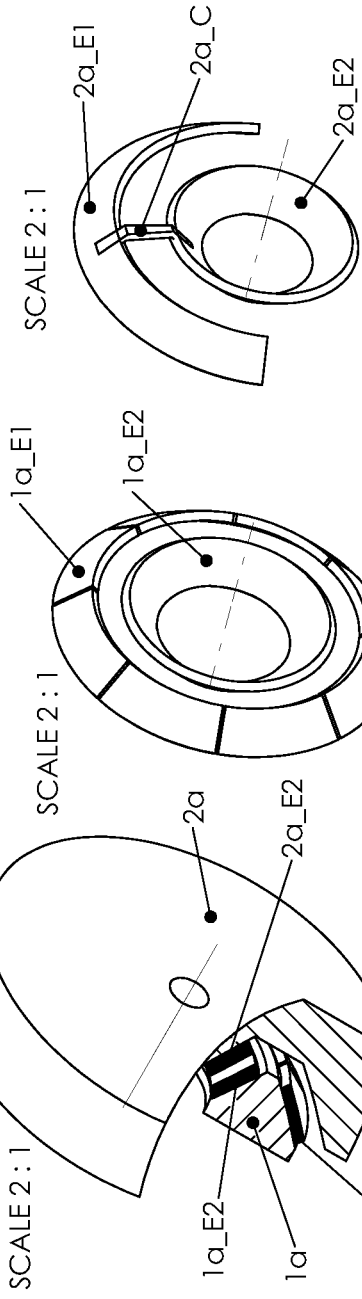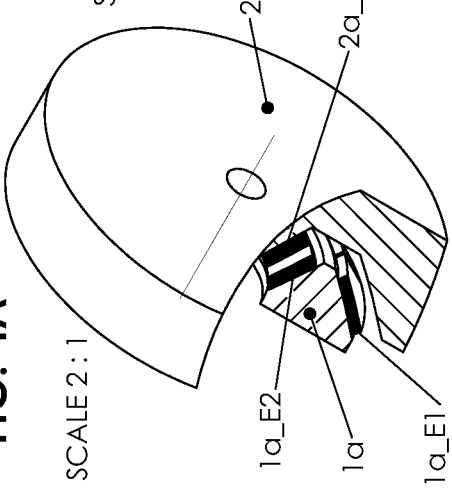

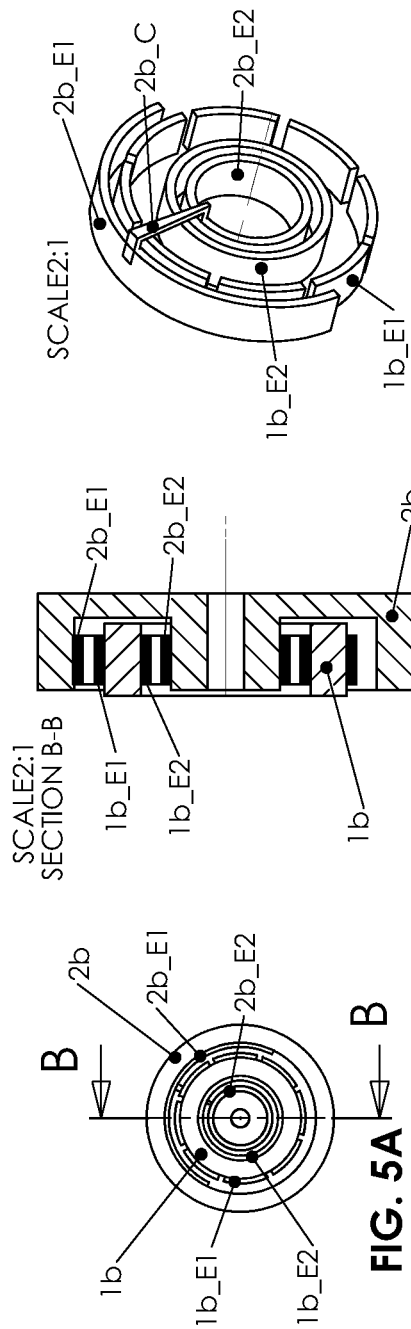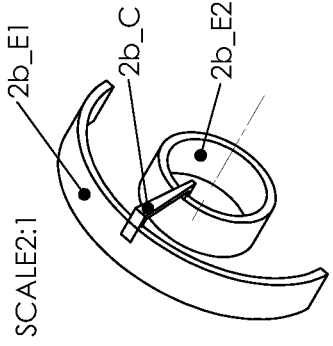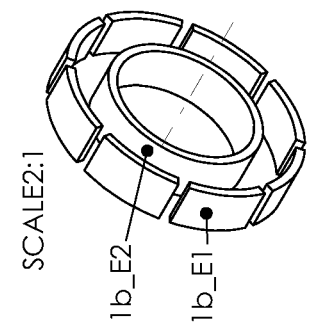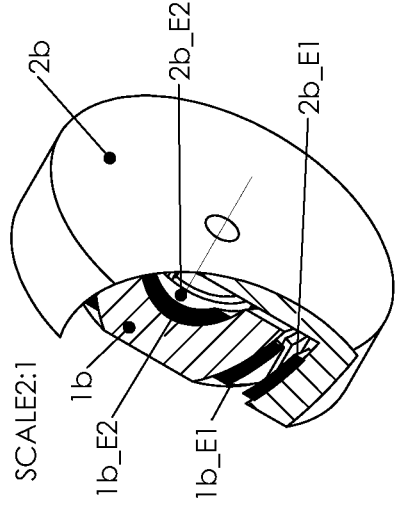

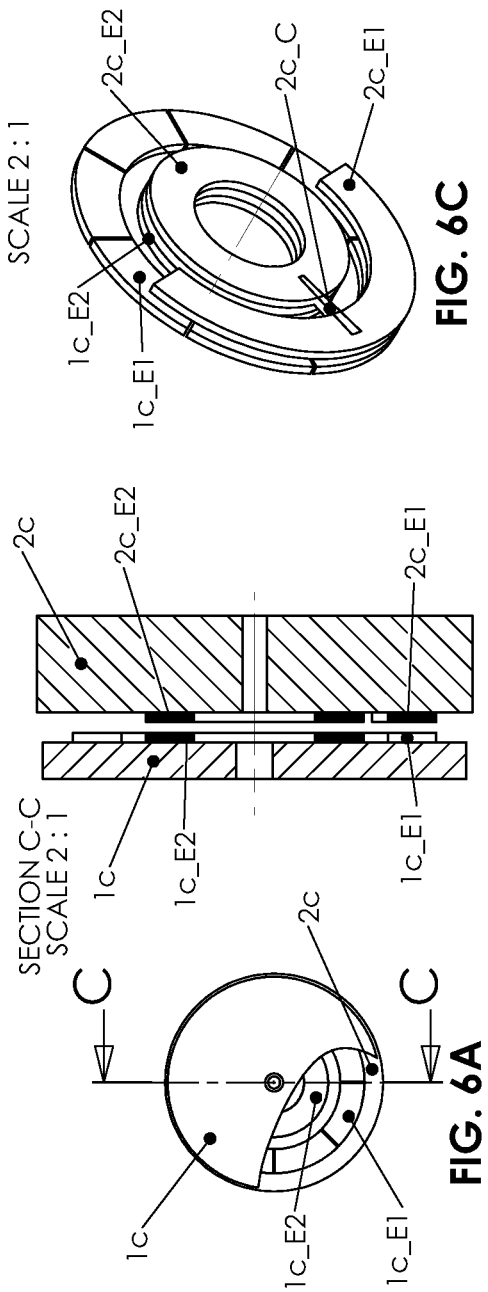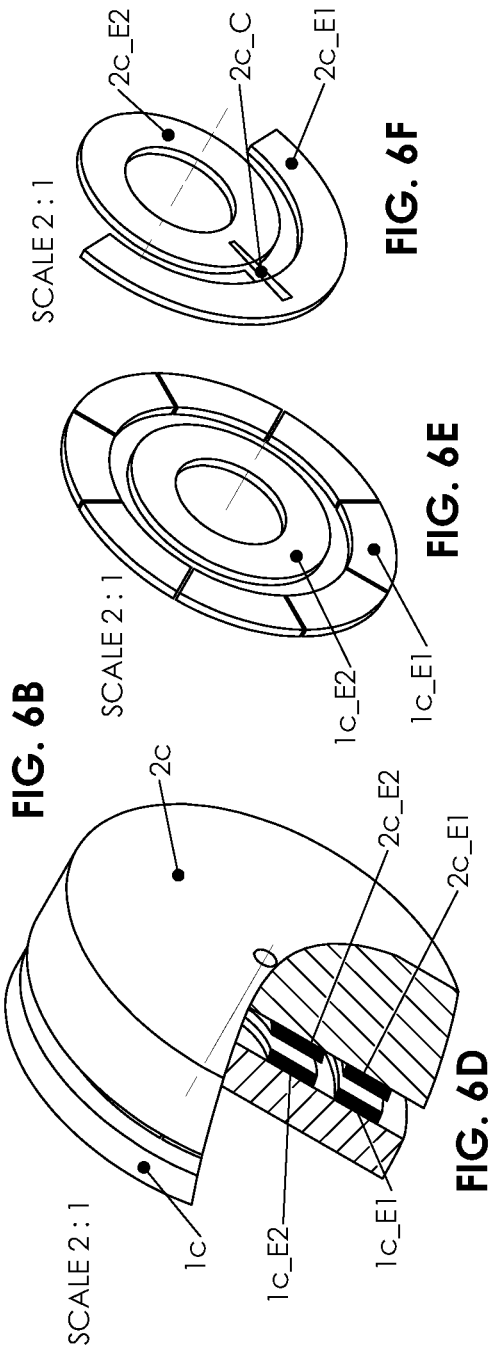

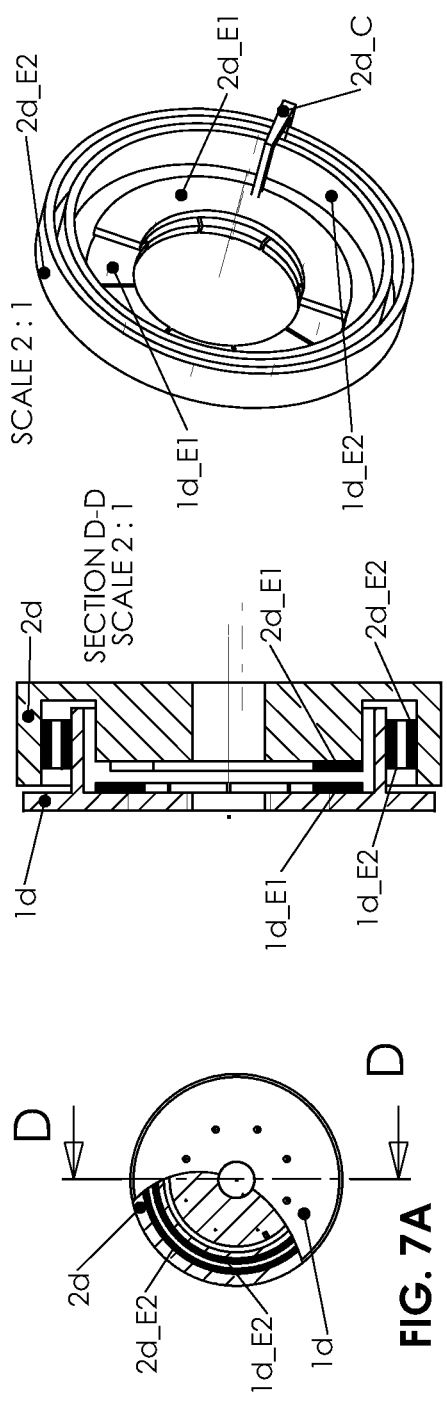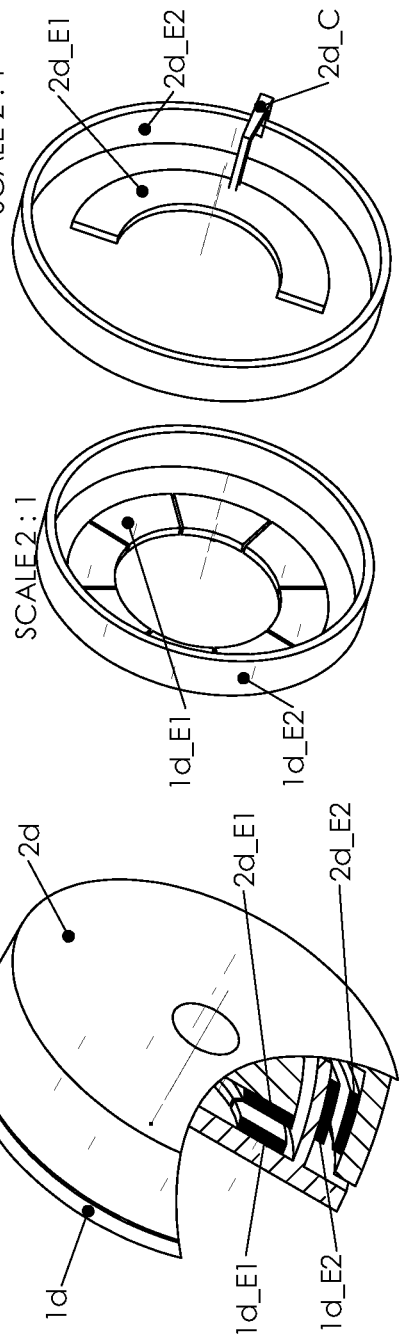

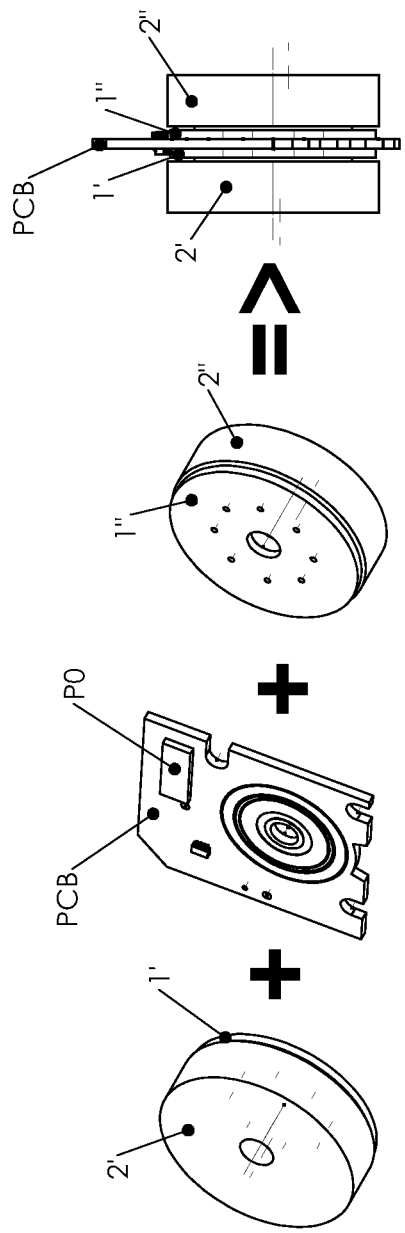

| Inputs | | Outputs | | | |
|---|---|---|---|---|---|
| CLR | CLK | Q0 | Q1 | Q2 | Q3 |
| 1 | X | 0 | 0 | 0 | 0 |
| 0 | ↑ | q3 | q0 | q1 | q2 | q = state of referenced output one setup time prior to active clock transition

FIG. 9C

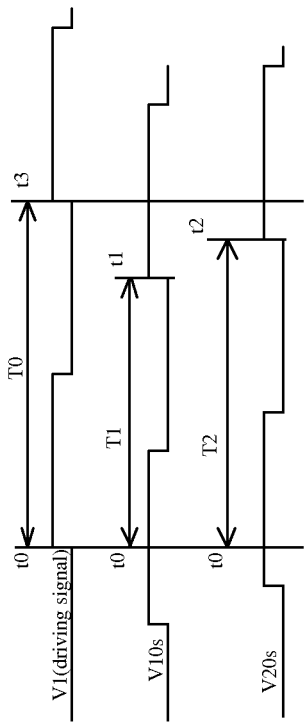
FIG. 9D
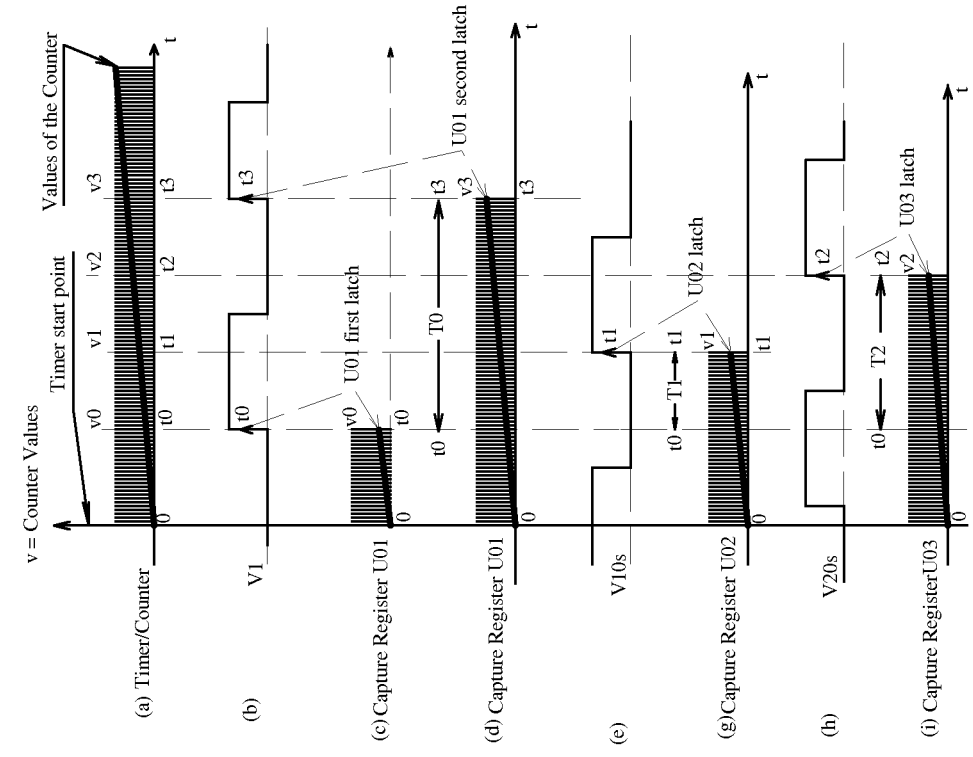
FIG. 9E
FIG. 9F

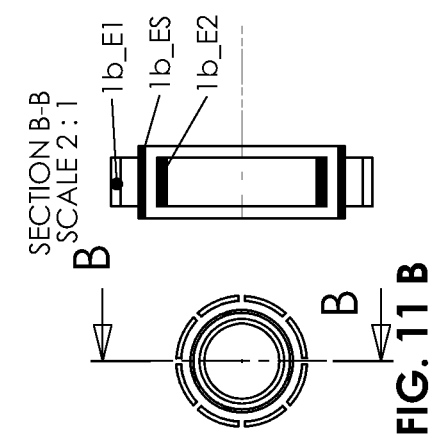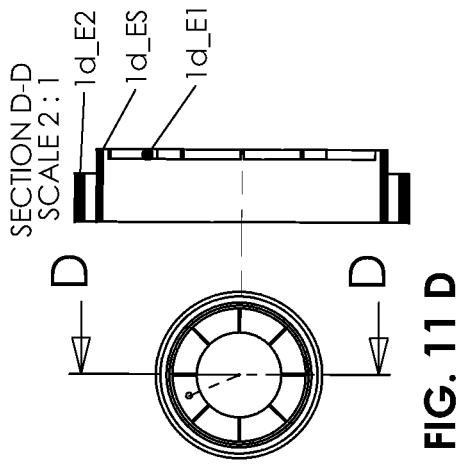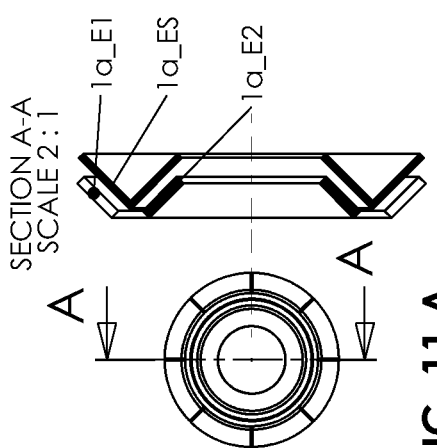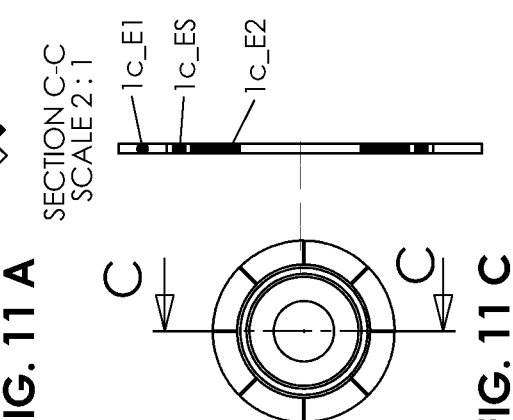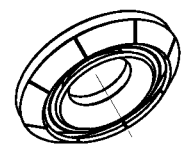
FIG. 11 A
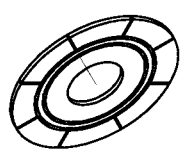
FIG. 11 C

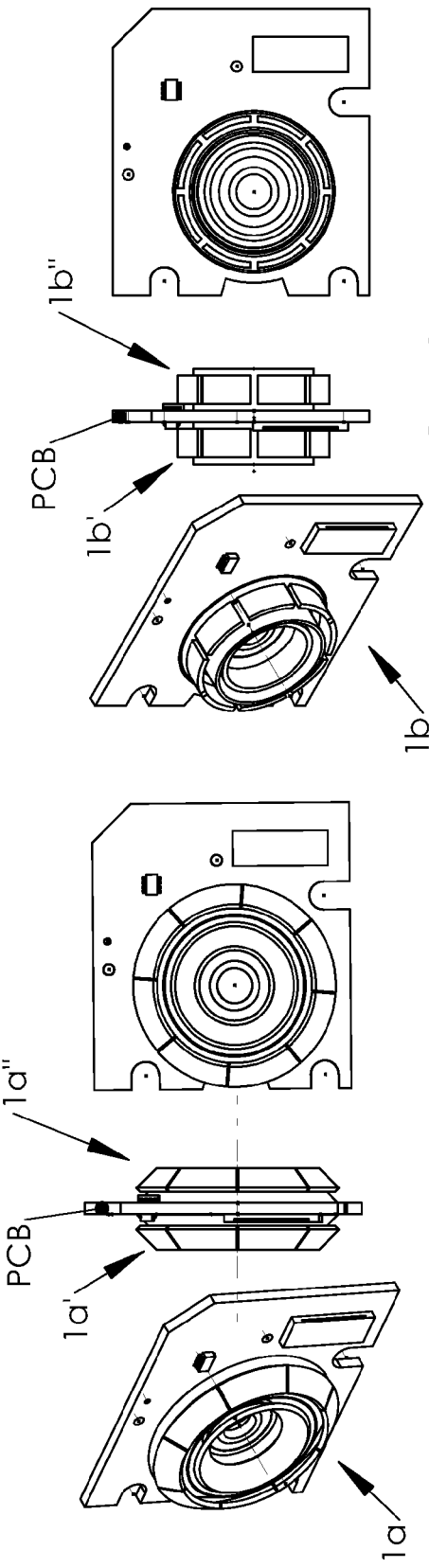
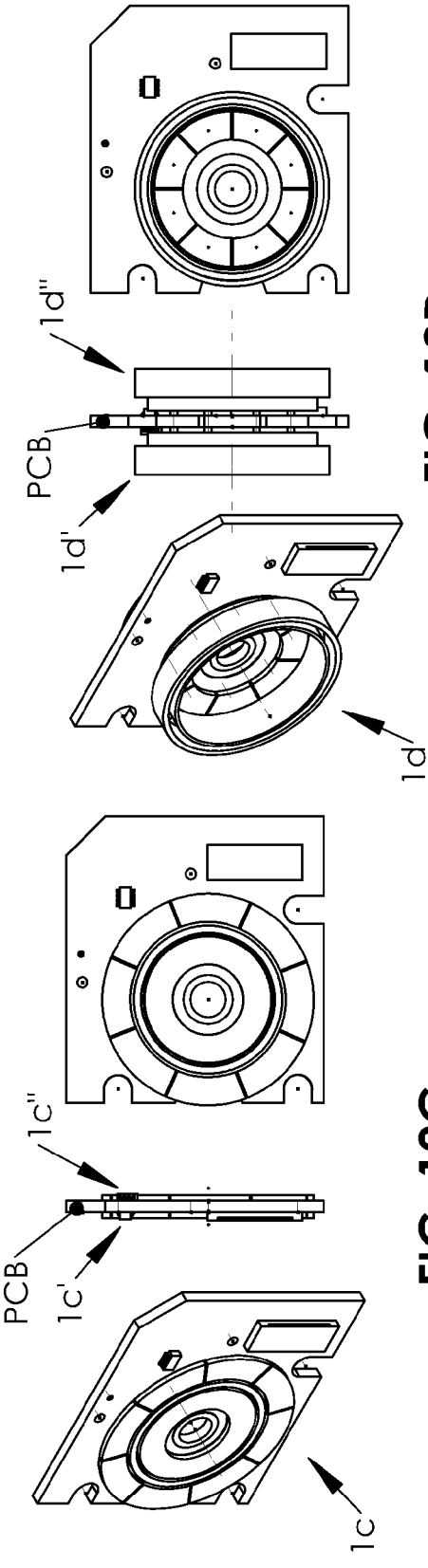
FIG. 12A
FIG. 12B
FIG. 12C
FIG. 12D

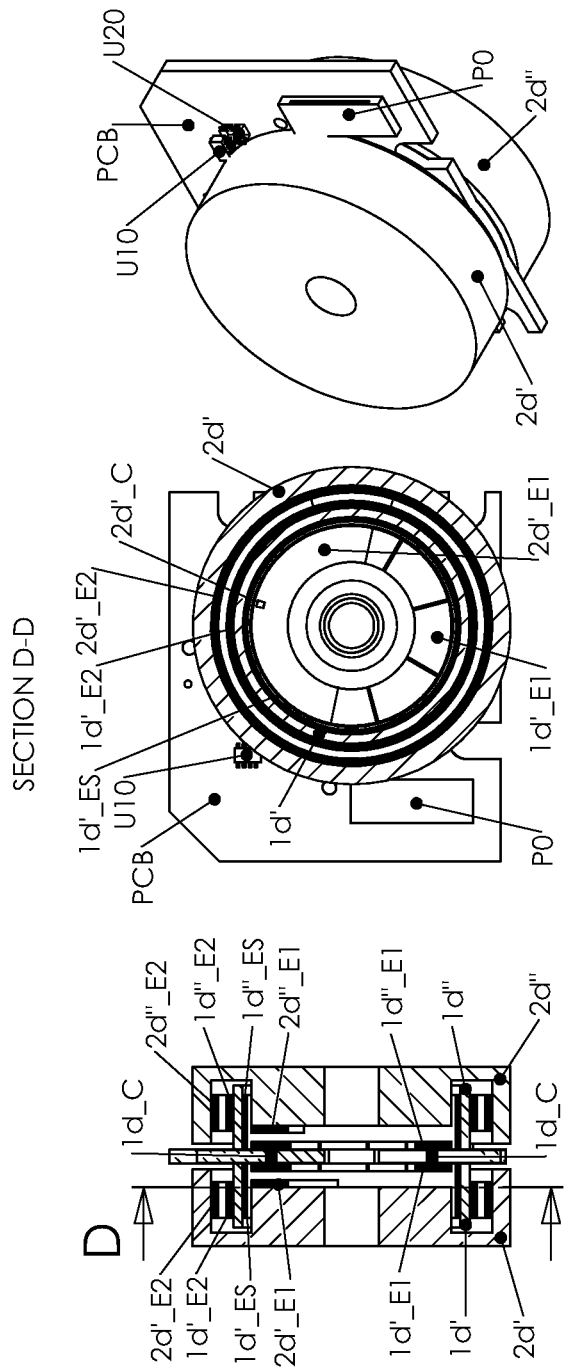

APPARATUS FOR VISUALLY AND REMOTELY DETERMINING AN ANGULAR POSITION OF A RELATIVE ROTATION OF PARTS

REFERENCES CITED

U.S. Patent Documents

U.S. Pat. No. 7,864,075 Jan. 4, 2011 Gondo
U.S. Pat. No. 5,796,250 Aug. 18, 1998 Dames; Andrew Nicholas
U.S. Pat. No. 5,736,865 Apr. 7, 1998 Nelson, et al
U.S. Pat. No. 4,788,546 Nov. 29, 1988 Sasaki
U.S. Pat. No. 4,737,698 Apr. 12, 1988 McMullin, et al.
U.S. Pat. No. 4,507,638 Mar. 26, 1985 Brosh
U.S. Pat. No. 4,471,450 Sep. 11, 1984 Amason
U.S. Pat. No. 4,425,511 Jan. 10, 1984 Brosh
U.S. Pat. No. 4,236,093 Nov. 25, 1980 Birnbaum
U.S. Pat. No. 4,223,300 Sep. 16, 1980 Wiklund
U.S. Pat. No. 4,080,592 Mar. 21, 1978 Zabler
U.S. Pat. No. 4,039,929 Aug. 2, 1977 Weckenmann
U.S. Pat. No. 3,198,937 Aug. 3, 1965 Wooster

BACKGROUND OF THE INVENTION

1. Field of the Invention

The present invention related to an apparatus and a method for sensing the angular position of a rotatable part e.g. a dial, wheel. The apparatus is especially intended for obtaining an electronic indication of the number wheels in a meter. More particularly, the present invention related to the non-contact angular position measurement and the low power data transmission applications. More particularly, the present invention related to the radio frequency identification (RFID) based data transmission applications. The invention may be applied to the determination of the angular position of the dials in a meter such as a water, gas or electricity meter, such demand meters are used to measure the maximum rate of flow volume or energy used averaged over a given time. In general, there are two primary requirements which are: (1) providing a rugged, reliable display of the quantity measured, and (2) the display should be nonvolatile so that the removal of power did not cause loss of the information displayed; The invention may also be applied to the auto meter reading in hash environment or flammable gas, liquid environment where the meter must be sealed and no battery or other power source allowed therewith.

2. Related Art

A previous non-contact position sensing mechanism uses a drive coil to produce alternating magnetic field and a LC resonant circuit of the rotatable member to sense the alternating magnetic field to detect the angular position of the rotatable member In the U.S. Pat. No. 5,796,250 Issued in Aug. 18, 1998 granted to Dames which including a drive coil with its axis corresponding to the axis of rotation of the rotatable member. A coil is wound around the rotatable member, and a capacitor is provided in the coil to form an LC resonant circuit. The coil on the rotatable member is wound so that application of an alternating magnetic field to the drive coil induces a resonance in the LC circuit which is constant for all angular positions of the rotatable member. The resonance of the LC circuit produces signals in a output coils which depend upon the angular position of the rotatable member. However, the use of coils to produce magnetic field needs a current source to drive the coil, the power consumed in the driving coil could be significant, especially in today's low power system. Furthermore, the resolution of the angular position detected by using this method is much lower than that of using the method of electrostatic capacity.

Another prior art, a non-contact position sensing mechanism, uses an electrostatic capacity of the relative rotatable members to detect the position of a rotary member, In the U.S. Pat. No. 5,736,865 Issued in Apr. 7, 1998 granted to Nelson. el. al. The system includes a circuit board having an arcuate array of conductor segments and a concentric pickup conductor. A rotary encoder disk has a conductive pattern which sums and couples the waveforms from selected segments to the pickup conductor; a synchronous phase detector generates a phase signal from the summed waveforms and the phase signal is detected by the zero crossing detecting circuit. A counter develops count signals used to generate the digital waveforms; the count signals are input to a latch which is clocked at the zero crossing point to latch the count value which is a digital measure of the encoder angle. However, these systems has an interference problem which is difficult to overcome, because both the array of conductor segments and the pickup conductor are provided together on a disk shape stationary part (the circuit board), the array of conductor segments and the pickup conductor are adjacently positioned. The interference with the electrostatic capacity results from interaction which occurs between the electrodes array of conductor segments and pickup conductor would not be avoided, and therefore, the output signal always includes some noise which influencing the accuracy of the output signal.

In order to solve the noise problem mentioned above, a U.S. Pat. No. 4,788,546 Issued in Nov. 29, 1988 granted to Sasaki, uses two stationary disks to separate the transmitting electrodes and the receiving electrode arranging the transmitting electrodes on a surfaces of one stationary disk and the receiving electrode on a surface of another stationary disk to isolate the driving signals of the transmitting electrodes and the pick up signal of the receiving electrode. However this configuration which provides an extra stationary disk increases the complex and the cost of product, making construction complex and expensive, because each stationary disk need to be aligned properly with two rotatable disk simultaneously.

As has been mentioned above, none of the above prior arts provided a high precision angular measurement and low power consumption system. For some applications, these solutions may be unreliable in hostile environments, or they may have insufficient resolution i.e. retaining the angular position information while removal power.

SUMMARY OF THE INVENTION

According to a first aspect of the present invention, there is provided an absolute angular position sensor which comprises first and second relatively rotatable parts, one is fixed part, another is rotating part; each part has two working surfaces, each of the two working surfaces of one part forms a working surface pair with a respective one of the two working surfaces of another part. One working surface pair is used for sensing purpose called sensing surface pair, another used for coupling purpose called coupling surface pair. Each working surface of a working surface pair is a surface of revolution which having a axis aligned with a common axis; each working surface of a working surface pair is equispaced from, and lies closely adjacent to another working surface of the working surface pair. A plurality of transmitting electrodes are secured to the sensing surface of the fixed part along its circumference; a receiving electrode, generally in a semicircle ring shape, is secured to the sensing surface of the rotating part; an output electrode is secured the coupling surface of the fixed part and a coupling electrode is secured to the coupling surface of the rotating part; the coupling electrode connected to the receiving electrode electrically for transferring the signals thereon. The movement of two relative rotatable parts causes the receiving electrode to translate along a predetermined path relative to the transmitting electrodes, and the capacitive coupling between the receiving electrode and the transmitting electrodes dependents on the relative angular positions of the two relative rotatable parts.

In a first embodiment of the invention, the working surface pairs are in a conical-frustum shape. In a second embodiment of the invention, the working surface pairs are in a cylinder shape. In a third embodiment, the working surface pairs are in a disk shape. In a fourth embodiment, the working surface pairs are in two different shapes, a cylinder-shaped coupling surface pair and a disk-shaped sensing surface pair.

According to the invention, there is also provided a method of determining the angular position of a rotating part comprising supplying voltages to the input means of such an apparatus, detecting the output signal in the output means produced in response thereto, and deriving the angular position therefrom.

According to a further aspect of the invention, there is provided a remotely reading metering system by using the radio frequency identification (RFID) technology, which is particularly suitable for remotely reading meters having wheel type meters.

According to the present invention, there is possible to design a meter for visually and remotely monitoring the angular position of the dials which the system power provided from the electromagnetically coupling during the remote reading, eliminating the need for batteries or wires.

Conclusion: A low noise and low power consumption, easy to manufacture absolute angular position sensor system powered from the outside of apparatus by wireless coupling is the critical feathers of the invention.

BRIEF DESCRIPTION OF DRAWINGS

Various embodiments will now be described, by way of example only, with reference to the accompanying drawings in which:

FIG. 2A to 2G show the construction of two relative rotatable parts with two conical-frustum-shaped working surface pairs which used to derive the four embodiments of sensors described later;

FIG. 3A is a first embodiment of the sensors having two conical-frustum-shaped working surface pairs and the electrodes secured to the respective working surfaces;

FIG. 3B is a second embodiment of the sensors having two cylindrical working surface pairs and the electrodes secured to the respective working surfaces;

FIG. 3C is a third embodiment of the sensors having two disc working surface pairs and the electrodes secured to the respective working surfaces;

FIG. 3D is a fourth embodiment of the sensors having a cylindrical working surface pair and a disk working surface pair and the electrodes secured to the respective working surfaces;

FIGS. 4A to 4F show the detail structures of the conical-frustum-shaped electrodes shown in FIG. 3A;

FIGS. 5A to 5F show the detail structures of the cylinder-shaped electrodes shown in FIG. 3B;

FIGS. 6A to 6F show the detail structures of the disk-shaped electrodes shown in FIG. 3C;

FIGS. 7A to 7F show the detail structures of the electrodes shown in FIG. 3D;

FIGS. 8A to 8D illustrate the construction of the Group Sensor of FIG. 1B;

FIG. 9C shows a Johnson Counter truth table for the logic of driving signal generator U4 of FIG. 9A;

FIG. 9D shows the waveforms of the capture input signals and the signal Timings of the Capture Block of FIG. 9A FIG. 9E is an electrical equivalent circuit of the Capture Block of FIG. 9A;

FIG. 9F shows a Capture Timing Waveforms for the signals of FIG. 9E;

FIGS. 11A to 11D show the shielding electrodes implementations for the four embodiments of the sensors which shown in FIGS. 3A to 3D.

FIGS. 12A to 12D show the implementations of the fixed parts of the Group Sensors for the four embodiments of sensors by using the structures of FIGS. 11A to 11D.

FIGS. 13A to 13C show the full structures of a Group Sensor for the fourth embodiment of FIG. 12D.

DETAILED DESCRIPTION OF THE INVENTION

Figure 1A:
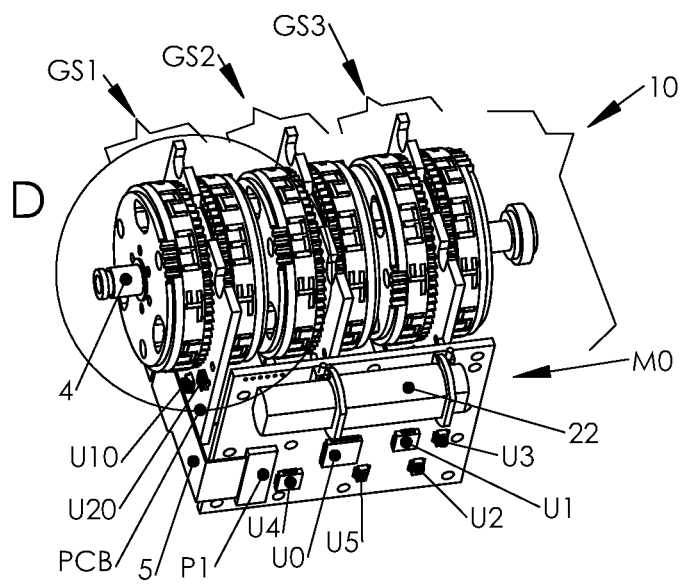
FIG. 1A is an isometric view of a visually and remotely readable meter, such as a water meter, comprising six dials according to the invention.

Referring now to the invention in more detail in FIG. 1A, which shows a visually and remotely readable meter 10 including three Group Sensors (GS1, GS2, and GS3). Each Group Sensor having two angular position sensors which including two dials (rotating parts 2' and 2" of FIG. 1B) with a fixed part (part 1) arranged therebetween. Part 1 of the Group Sensors is constructed from two fixed parts (part 1' and part 1") of the two angular position sensors and a piece of PCB as shown in FIG. 8D. A Main Board M0 is arranged on one side of three Group Sensors for processing sensor data, controlling system works and exchanging information with a reader station (not shown) outside of the meter. A flex printed cable (FPC) 5 is used to connect three Group Sensors (GS1, GS2, and GS3) and the Main Board. A common shaft 4 is used to mount the rotating parts of three Group Sensors. Each rotating part is marked with the digits 0 to 9 around its periphery. Two sensing signal amplifiers U10 and U20 (U20 on the back surface of PCB) are mounted on the two surfaces of PCB of each fixed part for amplifying sensing signals of the Group Sensors. A filter circuit U2 which including two band pass filters (BPF), a comparator circuit U5 which including two comparators, a Microcontroller U0 and a RFID circuit U1 are assembled on the surfaces of the Main Board. An Antenna assembly 22 is mounted on the top of the Main Board for coupling with the reader station outside of the meter for exchanging information therebetween wirelessly.

Note: For clarity reason, the digits 0 to 9 are not shown in the following figures.

Figure 1B:
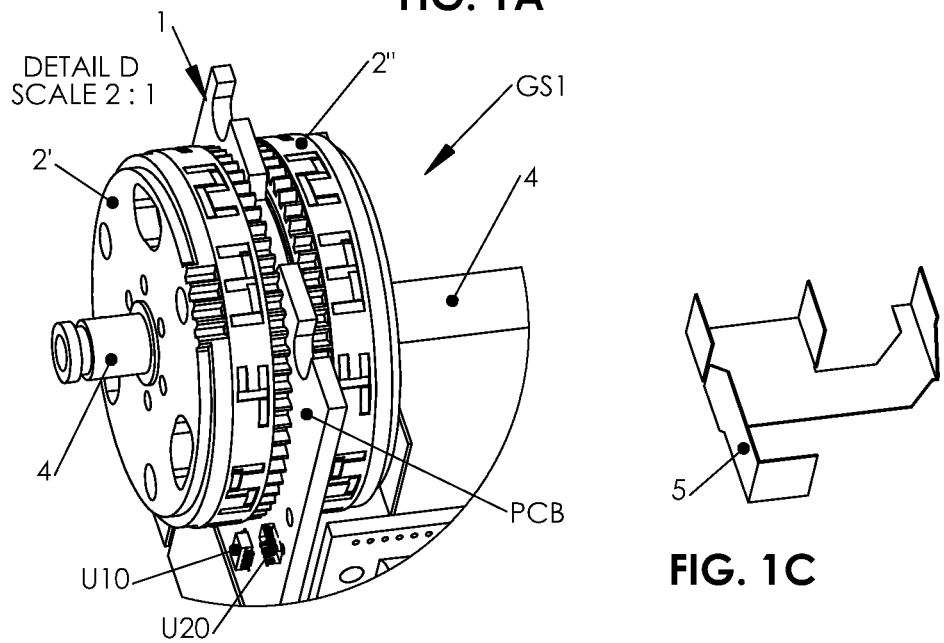
FIG. 1B is a 2:1 scale detail view of a Group Sensor including two dials of FIG. 1A.

FIG. 1B shows a Group Sensor (GS1). FPC 5 cable (the whole structure shown in FIG. 1C) is used to connect each of three Group Sensors and the Main Board for transmitting the signals therebetween.

The working principle of each angular position sensor is based on the capacitive coupling between the electrodes of the fixed part and the electrodes of the rotating part. Each electrode is secured and shaped to conform to a geometric surface called the surface of revolution which generated by rotating a polygon about an axis parallel to the plane of polygon, but not intersect the polygon. Two working surfaces of each part shown in FIG. 2E to FIG. 2F, which used to attach the electrodes of the sensors, are constructed with the surface of revolution.

FIGS. 2A to 2G geometrically show the principle to generate two parts (part 1 and part 2) and two working surfaces of each part. Part 1 includes two working surfaces 1S1 and 1S2 as shown in FIG. 2E; part 2 includes another two working surfaces 2S1 and 2S2 as shown in FIG. 2F. Two working surface pairs, one formed with surface 1S1 of part 1 and surface 2S1 of part 2; another formed with surface 1S2 of part 1 and surface 2S2 of part 2, are used by the sensors for sensing the angular positions with the electrodes secured thereto.

FIG. 2A shows two polygons 1P and 2P, two segment lines L11, L12 of Polygon 1P and two segment lines L21, L22 of polygon 2P are used to generate two working surface pairs (1S1, 2S1) and (1S2, 2S2) as shown in FIGS. 2A to 2B. L11 is parallel to L21, and L12 is parallel to L22; an axis A parallel to the plane of polygon 1P and 2P, but not intersected therewith. Two working surfaces 1S1, 1S2 of part1, and two working surfaces 2S1, 2S2 of part2 are formed by rotating 1P and 2P about the axis A. The two working surface pairs formed are in a shape of right conical frustum with two opening angles $\alpha$ and $\beta$ to determine the slopes of the surfaces (refer to FIGS. 2E to 2G).

FIG. 2B is an isometric view of the two relative rotatable parts formed from two polygons 1P and 2P of FIG. 2A; FIG. 2C is a left view; FIG. 2D is a front view; FIG. 2E is an isometric view of part 1; FIG. 2F is an isometric view of part 2; FIG. 2G is a 2:1 detail view of FIG. 2C for showing the slope control parameters, two opening angles $\alpha$ and $\beta$.

FIG. 2G shows two opening angles of the working surfaces of each part, each working surface is in a shape of frustum of right circular cone with the opening angle of the right circular cone, the opening angle is defined by the vertex angle made by a cross section through the apex and center of the base. The opening angle $\alpha$ (alpha) and the opening angle $\beta$ (beta) are two opening angles of the two working surfaces of each part. Each opening angle lies between 0.degree. and 180.degree. and the two opening angles $\alpha$ and $\beta$ are independent of each other.

With reference to FIGS. 2B to 2G again, the two working surface pair (1S1, 2S1) and (1S2, 2S2) are working surface pairs for sensing the angular position of the two relative rotatable parts with the electrodes secured thereto. The working surface 1S1 of the part 1 is equispaced from, and lies closely adjacent to the working surface 2S1 of the part 2, and the working surface 1S2 of the part 1 is equispaced from, and lies closely adjacent to the working surfaces 2S2 of the part 2. Geometrically the surface 1S1 and the surface 2S1 form a working surface pair (1S1, 2S1) and the surface 1S2 and the surface 2S2 form another working surface pair (1S2, 2S2), one of the working surface pairs is used for sensing angular position purpose called sensing surface pair, another is used for coupling angular position signals purpose called coupling surface pair.

Each working surface pair have two working surfaces, one of which is fixed called fixed working surface which is on the fixed part, another is rotatable called rotating working surface which is on the rotating part. Accordingly the two surfaces of the sensing surface pair consist of a fixed sensing surface and a rotating sensing surface, and the two surfaces of the coupling surface pair consist of a fixed coupling surface and a rotating coupling surface. The working surfaces are used to attach the respective electrodes for forming the angular position sensors. The electrodes attached to the fixed working surfaces are called fixed electrodes including eight transmitting electrodes $1x\_E1$ and an output electrode $1x\_E2$ (refers to FIG. 9B); the electrodes attached to the rotating working surfaces are called rotating electrodes including a receiving electrode $2x\_E1$ and a coupling electrode $2x\_E2$. Transmitting electrodes $1x\_E1$ and receiving electrode $2x\_E1$ used for sensing the angular positions secured to the respective surfaces of sensing surface pair are called sensing electrode pair, and output electrode $1x\_E2$ and coupling electrode $2x\_E2$ used for coupling the signals of angular positions secured to the respective surfaces of coupling surface pair are called coupling electrode pair.

As described above, the transmitting electrodes are secured to the fixed sensing surface and the receiving electrode is secured to the rotating sensing surface; the output electrode is secured to the fixed coupling surface and the coupling electrode is secured to the rotating coupling surface. A conductor $2x\_C$ (e.g. $2a\_C$ for a first embodiment of FIG. 4F) is used to connect the receiving electrode and the coupling electrode for transferring the voltage signals of the receiving electrode to the coupling electrode.

Notes: 1) The letter x in the Reference numbers of the Figures represents four embodiments, x=a, b, c, d, e.g. when x=a, $1x\_E1 \Rightarrow 1a\_E1$ which represents the transmitting electrode for the first embodiment etc.

2) Preferably, each electrode is constituted by an electrical conductive layer secured to the respective surface. Each layer is a printed circuit.

FIGS. 3A to 3D are four embodiments of the sensors, each of which is derived from the basic shape of the conical frustum by assigning different values to the opening angles for each of the two working surface pairs. The electrodes of the sensors are also shown on the respective working surfaces which are shaped to conform thereto.

FIG. 3A is a first embodiment of the sensors having two conical frustum working surfaces which the opening angles $\alpha=\beta=45$ degrees with the electrodes are secured thereto. The more detail views are shown in FIGS. 4A to 4F;

FIG. 3B is a second embodiment of the sensors having two cylindrical working surfaces which the opening angles $\alpha=\beta=0$ degree with the electrodes are secured thereto. The more detail views are shown in FIGS. 5A to 5F;

FIG. 3C is a third embodiment of the sensors having two disk shape working surfaces which the opening angles α=β=180 degrees with the electrodes are secured thereto. The more detail views are shown in FIGS. 6A to 6F;

FIG. 3D is a fourth embodiment of the sensors having a cylindrical working surface which the opening angle α=0 and a disk shape working surface of opening angle β=180 with the respective electrodes secured thereto. The more detail views are shown in FIGS. 7A to 7F.

FIGS. 4A to 4F show the details structure of the electrodes for the first embodiment of the sensors with the opening angles of α=β=45 degrees, where each working surface formed is in a shape of conical frustum. FIG. 4A is a front view; FIG. 4B is a scale 2:1 section view for showing the detail structures of this embodiment; FIG. 4C is a scale 2:1 isometric view of the electrodes for showing the relationships of the electrodes; FIG. 4D is a scale 2:1 isometric view with a portion of broken view for showing the detail structures, FIG. 4E is an isometric view of the electrodes on fixed part $1a$, FIG. 4F is an isometric view of the electrodes on rotating part $2a$. Part $1a$ (which is part 1 of the first embodiment) is a fixed part (corresponding to part 1 of FIG. 1B), and part $2a$ (corresponding to parts 2' and 2" of FIG. 1B) is a rotating part. Eight transmitting electrodes $1a\_E1$ are secured thereto the fixed sensing surface of the sensing surface pair; a receiving electrode $2a\_E1$ is secured thereto the rotating sensing surface of the sensing surface pair to couple with the transmitting electrodes; an output electrode $1a\_E2$ is secured thereto the fixed coupling surface the coupling surface pair for receiving the signals of the coupling electrode $2a\_E2$. A conductor $2a\_C$ is used to connect receiving electrode $2a\_E1$ and coupling electrode $2a\_E2$ together for transferring the signals of the receiving electrode to the coupling electrode.

FIGS. 5A to 5F show the details structure of the electrodes for the second embodiment of the sensors with the opening angles of α=β=0 degrees, where each working surface formed is in a shape of cylinder. FIG. 5A is a front view; FIG. 5B is a scale 2:1 section view for showing the detail structures of this embodiment; FIG. 5C is a scale 2:1 isometric view of the electrodes for showing the relationships of the electrodes; FIG. 5D is a scale 2:1 isometric view with a portion of broken view for showing the detail structures, FIG. 5E is an isometric view of the electrodes on fixed part $1b$, FIG. 5F is an isometric view of the electrodes on rotating part $2b$. Part $1b$ (which is part 1 of the first embodiment) is a fixed part (corresponding to part 1 of FIG. 1B), and part $2b$ (corresponding to parts 2' and 2" of FIG. 1B) is a rotating part. Eight transmitting electrodes $1b\_E1$ are secured thereto the fixed sensing surface of the sensing surface pair; a receiving electrode $2b\_E1$ is secured thereto the rotating sensing surface of the sensing surface pair to couple with the transmitting electrodes; an output electrode $1b\_E2$ is secured thereto the fixed coupling surface the coupling surface pair for receiving the signals of the coupling electrode $2b\_E2$. A conductor $2b\_C$ is used to connect receiving electrode $2b\_E1$ and coupling electrode $2b\_E2$ together for transferring the signals of the receiving electrode to the coupling electrode.

FIGS. 6A to 6F show the details structure of the electrodes for the third embodiment of the sensors with the opening angles of α=β=180 degrees, where each working surface formed is in a shape of disk. FIG. 6A is a front view; FIG. 6B is a scale 2:1 section view for showing the detail structures of this embodiment; FIG. 6C is a scale 2:1 isometric view of the electrodes for showing the relationships of the electrodes; FIG. 6D is a scale 2:1 isometric view with a portion of broken view for showing the detail structures, FIG. 6E is an isometric view of the electrodes on fixed part $1c$, FIG. 6F is an isometric view of the electrodes on rotating part $2c$. Part $1c$ (which is part 1 of the first embodiment) is a fixed part (corresponding to part 1 of FIG. 1B), and part $2c$ (corresponding to parts 2' and 2" of FIG. 1B) is a rotating part. Eight transmitting electrodes $1c\_E1$ are secured thereto the fixed sensing surface of the sensing surface pair; a receiving electrode $2c\_E1$ is secured thereto the rotating sensing surface of the sensing surface pair to couple with the transmitting electrodes; an output electrode $1c\_E2$ is secured thereto the fixed coupling surface the coupling surface pair for receiving the signals of the coupling electrode $2c\_E2$. A conductor $2c\_C$ is used to connect receiving electrode $2c\_E1$ and coupling electrode $2c\_E2$ together for transferring the signals of the receiving electrode to the coupling electrode.

FIGS. 7A to 7F show the details structure of the electrodes for the fourth embodiment of the sensors with a cylinder-shaped coupling surface pair which the opening angles of α=0 and a disk-shaped sensing surface pair which the opening angles of β=180 degrees. FIG. 7A is a front view with a portion broken view; FIG. 7B is a scale 2:1 section view of the front view for showing the detail structures of the electrodes; FIG. 7C is a scale 2:1 isometric view of the electrodes for showing the relationship of the electrodes; FIG. 7D is a scale 2:1 isometric view with a portion broken view to show the electrodes and the detail structures, FIG. 7E is an isometric view of the fixed electrodes on fixed part $1d$, FIG. 7F is an isometric view of the rotating electrodes on rotating part $2d$. Part $1d$ is a fixed part (corresponding to part 1 of FIG. 1B) and part $2d$ is a rotating part (corresponding to parts 2' and 2" of FIG. 1B). Eight transmitting electrodes $1d\_E1$ are secured thereto the fixed sensing surface of part $1d$; a receiving electrode $2d\_E1$ is secured thereto the rotating sensing surface of part $2d$ coupling with the transmitting electrodes; an output electrode $1d\_E2$ which in the cylindrical shape is secured thereto the fixed coupling surface of part $1d$ to couple a voltage signal of coupling electrode $2d\_E2$ therefrom; coupling electrode $2d\_E2$ connected to the receiving electrode through a conductor $2d\_C$ to transfer the voltage signals thereon. The differences of this embodiment from the other three are that the transmitting electrodes $1d\_E1$ and the receiving electrode $2d\_E1$ are arranged inwardly in the disk shape while the output electrode and the coupling electrode are arranged outwardly in the cylindrical shape. The reason to arrange the electrodes such is that the output electrode can be directly connected to the input of the sensing signal amplifier eliminating the trace of the connection through the middle layer of PCB (part $1d$ generally implemented with a piece of PCB for mounting the electronic components), so that the interferences coupled to the sensing signal amplifier smaller than that of the other embodiments.

Other embodiments are also possible by applying the different opening angles α and β from 0-180 (α and β can be different) and/or reversing the working surfaces of the two parts together with the respective electrodes secured thereto. By using a working surface pair of one embodiment combined with a working surface pair of another embodiment to practice a new type sensor is also possible as is shown in the fourth embodiment.

FIGS. 8A to 8D illustrate the construction of a Group Sensor, where a PCB is sandwiched between two fixed parts 1' and 1" of two sensors. FIG. 8A is an isometric view of a sensor having a fixed part (part 1') and a rotating part (part 2'); FIG. 8C shows a second sensor, but flipped positioned, part 1" is the fixed part; part 2" is the rotating part. FIG. 8B shows an isometric view of a PCB which used to assemble two sensors and providing driving signals to the sensors and collecting the sensing signals from the sensors, P0 is a Group Signal Connector for exchanging signals with the Main Board; FIG. 8D is the constructed Group Sensor which merged from FIGS.

8A to 8C having a merged fixed part which including part 1', part 1" and PCB) and two rotating parts (part 2' and part 2"). The sensors constructed in this way make the structure more compact and the electrical connections less (with minimum traces), so that the structures of the meter simplified and the cost with this structure reduced.

With reference to FIGS. 1A to 1C again, the meter are assembled with three Group Sensors, each Group Sensor FIG. 1B includes a common fixed part (part 1) and two rotating parts (2' and 2"). Two sensing signal amplifiers U10 and U20 (U20 on the back surface of PCB) are also assembled on the surfaces of the PCB of the fixed part of each Group Sensor. Main Board M0 is shared in common by all three Group Sensors. FPC 5 is provided between connector P1 of the Main Board and connector P0 (refers to FIG. 8B) of each Group Sensor for transmitting data therebetween.

Figure 9A:
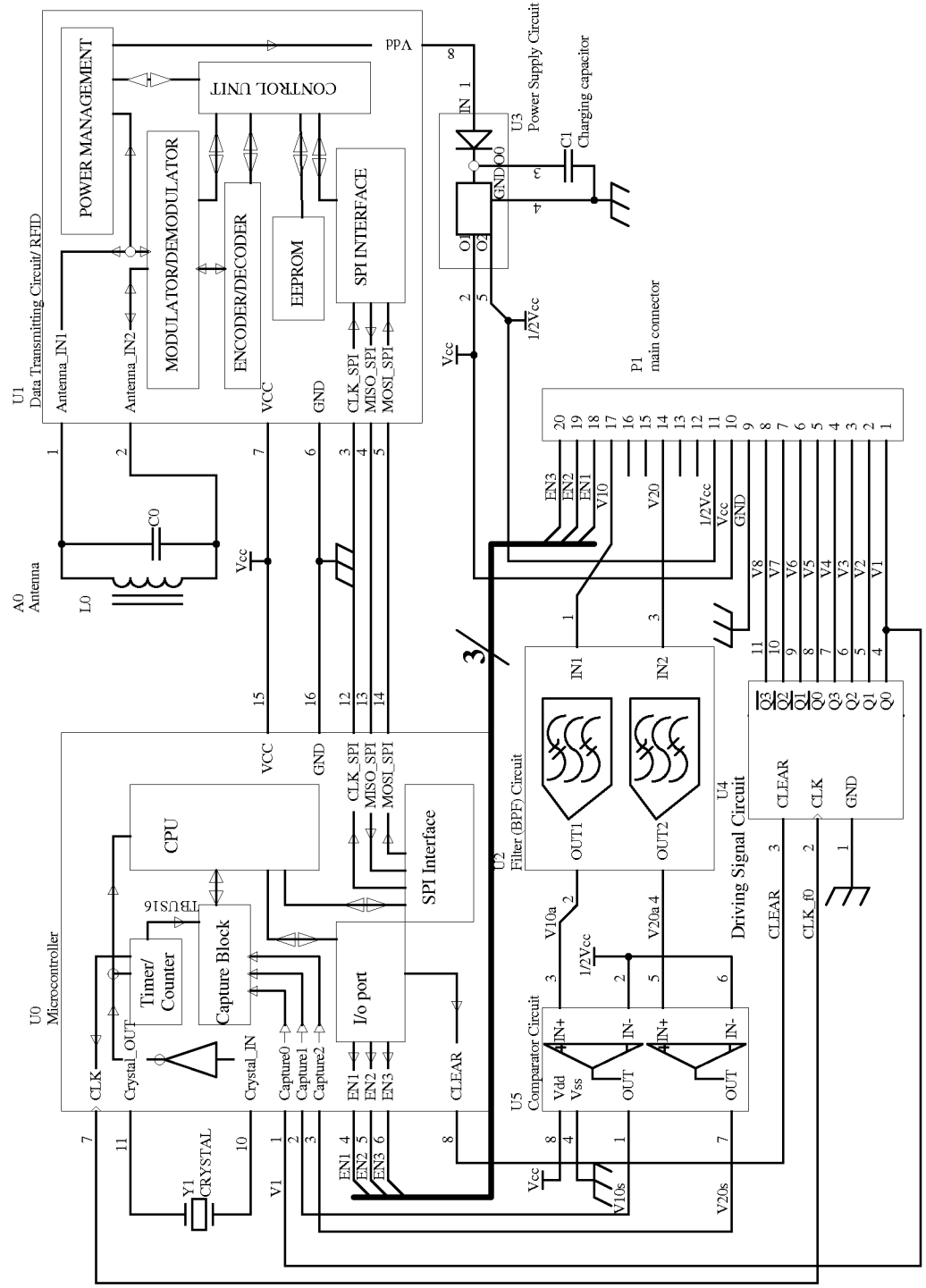
FIG. 9A is a Schematic Diagram of the Main Board shown in FIG. 1A.
Figure 9B:
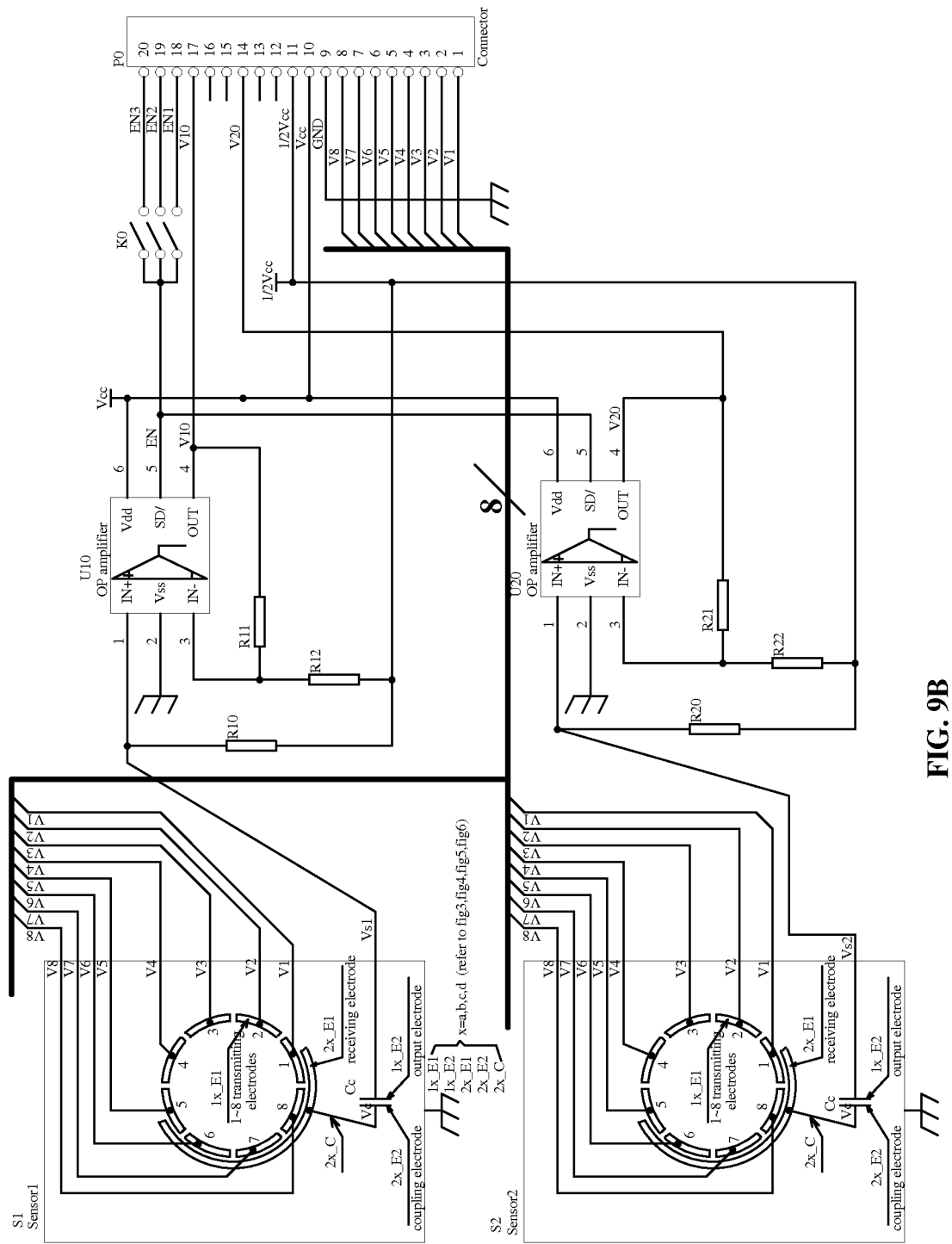
FIG. 9B is a Schematic Diagram of a Group Sensor of FIG. 1A.

With reference to FIG. 9B, sensor S1 and sensor S2 are the electrical equivalent circuits of the two sensors of the Group Sensor for the four embodiments. Each sensor includes eight segment conductors 1 to 8 of the transmitting electrodes $1x\_E1$, a receiving electrode $2x\_E1$ which used to sense the electric fields of the transmitting electrodes and a capacitor Cc. the capacitor Cc is the equivalent capacitor formed between coupling electrode $2x\_E2$ (left electrode of capacitor Cc) and output electrode $1x\_E2$ (right electrode of capacitor Cc); $2x\_C$ represents a conductor which used to connect receiving electrode $2x\_E1$ and coupling electrode $2x\_E2$; two sensing signal amplifiers U10 and U20 are used to amplify the output sensing signals Vs1 and Vs2 respectively induced on the output electrode of the two sensors.

There are two identical sensing signal amplifier channels shown in FIG. 9B. Only the first channel (with sensor S1) is needed to be analyzed (unless the signal related to the second channel). To detect the angular position of the sensor, a source of polyphase squarewave voltages V1 to V8 are supplied to the transmitting electrodes (electrodes 1 to 8 of S1) sequentially; successive ones of the transmitting electrodes are connected to the successive squarewave voltages. Eight phase electric fields are generated on a predetermined path of receiving electrode $2x\_E1$ by the voltages V1~V8 of the transmitting electrodes. A portion of the polyphase electric fields that under the area of receiving electrode $2x\_E1$ are coupled to receiving electrode $2x\_E1$ and induced a coupling signal Vc thereon. The coupling electrode $2x\_E2$ connected to receiving electrode $2x\_E1$ by conductor $2x\_C$ receives the coupling signal Vc and couples the coupling signal Vc to output electrode $1x\_E2$ with an output sensing signal Vs1 produced thereon. The output sensing signal Vs1 is proportional to the angular position signal Vc and determined by the angular position of the receiving electrode $2x\_E1$ which represent the angular position of the rotating part of the sensor; the phase of Vs1 provides only one electrical cycle per complete mechanical rotation of the rotating part. A high input impendence signal amplifier U10 with a low level enabled control terminal SD/ (pin5) is provided to amplifier the input signal Vs1 and output a output sensing signal V10, when electric level of control terminal at high level, the output of amplifier pin4 is disabled (in a high impedance status); otherwise the output (pin4 of the U10) outputs a output sensing signal V10 (a low impedance signal), the amplitude of V10 is determined by equation V10=gain*Vs1 where the gain depends on the value of R11, R12 and determined by gain= (R11+R12)/R12. Group Addressing Signal EN of the control terminal is connected to one of Group Selecting Signals EN1 to EN3 of the Main Board. A Group Selecting Switch K0 is used to select one of three Group Selecting Signals EN1, EN2 and EN3. The output sensing signal V10 of amplifier U10 is connected to Group Signal Connector P0 to be further processed by the Signal Processing Module of the Main Board; resistors R10 and R20 are bias resistors used to set the working condition of sensing signal amplifier U10 connected to a bias voltage of roughly ½Vcc provided on P0 from the Main Board. Amplifier U10 is an output controllable OP (operating amplifier) amplifier such as MAXIM9910 to 9913 from MAXIM or a general OP (without control function) with an extra analog switch circuit to switch the output sensing signals.

The circuit of FIG. 9B is mounted on the PCB of the fixed part of each Group Sensor. The three positions of K0 are used to choose one of Group Selecting Signals En1, En2 or En3 according to the group which the circuit belongs to.

FIG. 9A shows a schematic diagram of the Main Board performing the following functional circuits:
a) Driving Signal Circuit, and
b) Signal Processing Module, and
c) RFID Data Transmitting Circuit, and
d) Central Control Circuit.

The Driving Signal Circuit comprises a Johnson counter U4 (the truth table shown in FIG. 9C) which driven by a clock signal provided from Microcontroller U0 for generating eight phase squarewave voltages V1~V8 for driving the transmitting electrodes of each sensor. The eight phase squarewave voltages are connected to a main connector P1. A FPC cable 5 (refers to detail view FIG. 1C) is used to distribute the signals of the Main Board to each of three Group Sensors. The frequency of the squarewave voltages is one eighth (⅛) frequency of the clock signal CLK_f0 (on pin2 of U4). A pulse of CLEAR signal (connected to pin3 of U4) is used to set the counter U4 to an initial state 0x00 (0x represents hex value). Note: Q0/, Q1/, Q2/, Q3/ of U4 shown in FIG. 9A are the respective negative outputs of Q0, Q1, Q2, Q3.

A Signal Processing Module provided by the Main Board shown in FIG. 9A for managing the signals of the Group Sensors includes:
Group Selecting Signals (EN1, EN2 and EN3) generating circuit, and
Two Channel Band Pass Filter circuit U2, and
Two Channel Comparator circuit U5, and
Capture circuit which provided by Capture Block of the Microcontroller U0.

Group Selecting Signals EN1, EN2 and EN3 are generated by the I/O port of Microcontroller U0. Two Channel Band Pass Filter circuit U2 are active filters being implemented from Butter worth filter or Bessel filter; the passive RC or LC filter and Low Pass filter (LPF) can also be used to replace the Band Pass Filter. But the BPF can filter low frequency interference signals while LPF can't, so BPF is the first recommended filter to be used in the design.

The two channel circuits (filter circuit U2 and comparator circuit U5) of FIG. 9A are identical with each other, using same way to analyze the two amplifier circuit of FIG. 9B, only the first channel (with signal V10) of the Main Board is being analyzed. Signal V10 which comes with a selected Group Sensor (selected by one of Group Selecting Signals) is sent to a filter channel of U2 as the input and processed therewith; the output filtered signal (sinewave signal V10*a*) is then sent to an input of comparator circuit U5 compared with a preset electric level ½Vcc, a squarewave signal V10*s* is delivered from the comparator U5 and sent to the Capture Block of Microcontroller U0 for determining the Transiting Time of the squarewave signal.

FIG. 9D shows the Timings of a reference driving signal V1 and two input squarewave signals V10*s* and V20*s* of each Group Sensor, which is used by the Capture Block of U0 shown FIG. 9A. T0 is the signal cycle of the three signals, T1 the time deviation of signal V10s, T2 the time deviation of signal V20s, t0 is a start time of the rising edge of driving signal V1, t1 is a transition time of V10s within the signal cycle, t2 is a transition time of V20s within the signal cycle, t3 is the end cycle transition of the driving signal V1.

FIG. 9E is the electrical equivalent circuit of the Capture Block of U0 shown in FIG. 9A, the corresponding Capture Timing Waveforms are shown in FIG. 9F. Three capture channels are driven by a 16 bits Counter Register of the Timer, a Start Clear Signal CLR, a phase signal V1 and two sensor input signals V10s, V20s. a positive valid signal CLR is used to clear the Counter Register of the Timer (corresponding to Timer start point (a) of FIG. 9F) and the interrupt flag of the three Capture Registers U01, U02 and U03. After signal CLR returned to the inactive state (negative), the Counter Register is started to count from zero (refers to the solid slope line (a) of FIG. 9F). As the content of the Counter Register increasing, the capture time pass the points t0, t1, t2 and t3 and the respective Capture Register contents (value) v0(t0), v1(t1), v2(t2) and v3(t3) were latched as shown in (c)(d)(g)(i) of FIG. 9F. At time t0 rising edge V1 latches v0 of the output of the Counter Register to Capture Register U01 as shown in (b)(c) of FIG. 9F; at point t1, rising edge V10s latches v1 of the output of the Counter Register to Capture Register U02 as shown in (e)(g) of FIG. 9F, and similarly at point t2, rising edge V20s latches v2 to Capture Register U03 as shown in (h)(i) of FIG. 9F; finally at point t3, rising edge V1 latches v3 to Capture Register U01 again which refreshing Capture Register U01 as shown in (b)(c) of FIG. 9F. Be remember, before point t3, the previous value v0 (t0) has been read and saved for preventing the new value v3 to overwrite the value v0.

The signal phase of each channel is calculated from three timing variables, T0—cycle of the signals, T1—relative timing transition of V10s, T2—relative timing transition of V20s. T0, T1 and T2 are calculated by T0=t3−t0, T1=t1−t0, T2=t2−t0; values v0, v1, v2 and v3 are discrete values of the respective t0, t1, t2 and t3. the Microcontroller uses v0, v1, v2 and v3 to calculate T0, T1 and T2 in real case, but for the clarity, we still use t0, t1, t2, t3 to replace v0, v1, v2, v3 in the following calculations. After a cycle timings of the Group Sensor captured, the Microcontroller can calculate the phases of signals by equations θ1=T1/T0*360 for the channel of sensor1 (first channel), and θ2=T2/T0*360 for the channel of sensor2 (second channel).

Note: The Capture Block Schematic FIG. 9E is used for illustrating the Capture Block functions only which based on the capture functions 16-bit Timer_A of the Texas Instrument MSP430x22x4 16-bit Ultra-Low-Power Microcontroller by omitting some unnecessary signals.

Figure 9G:
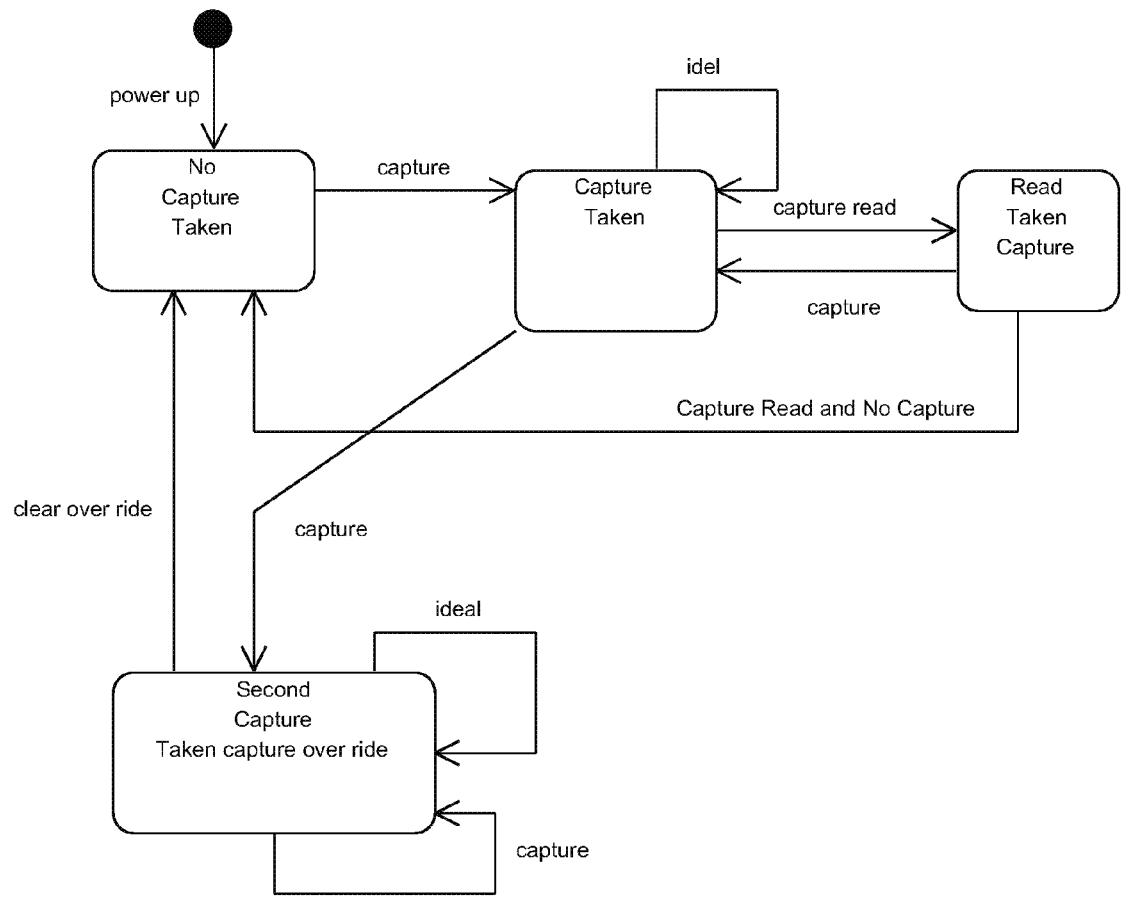
FIG. 9G is a Capture Cycle State Machine for each capture channel shown in FIG. 9E.

With further reference to U0 of FIG. 9A, the Timer/Counter includes a 16 bits Counter Register (not shown) with its output connected to the Capture Block; the Capture Block uses a latchable Register to latch the output of 16 bits Counter Register of the Timer for the timing transition measurements (refers to FIG. 9E). The inputs of three capture channels are connected to the external pin (pin1 to 3 of U0) for capturing three input signals including a driving signal V1 and two sensor signals V10s and V20s. A capture will be occurred on a rising edge of an input signal V1, V10s or V20s with a respective capture channel 0, 1 or 2. Due to the capture signals are asynchronous to the clock of the Counter Register; the frequency of the clock should be as high as possible for increasing the capture resolution of the Captured Signals; but the higher frequency, the high power consumptions of the capture circuit. A proper clock frequency selected should achieve enough capture resolution for an application while the power consumption is still acceptable. FIG. 9G is a Hardware Logic Control State Machine Diagram which used to control the capture cycle of each capture channel for the Capture Block Schematic of FIG. 9E.

As has been described above, the function of the Capture Block of U0 shown in FIG. 9A is to capture the Transiting Timings of three squarewave signals (channel schematic shown in FIG. 9E and the Capture Timing Waveforms shown in FIG. 9F). The Transiting Timings of three squarewave signals V1, V10s and V20s are used to calculate the angular positions of the Group Sensor. The following algorithm is Microcontroller U0 of FIG. 9A used to process the captured Transiting Timings and calculate the phase of two signals V10s and V20s. The transiting timing t1 of V10s or t2 of V20s (refer to (g) (i) FIG. 9F) are stored to an address of RAM (random access memory) after captured, and a reference signal timing t0 shown in (d) of FIG. 9F which corresponding to a start Transiting Time t0 of a driving squarewave voltage V1 (shown in (b) of FIG. 9F) is accessed (read) from a respective address of RAM which stored previously and captured by Capture Register U01 of FIG. 9E. The relative Transiting Time T1 of V10s (refer to (e) of FIG. 9F) and T2 of V20s (refer to (h) of FIG. 9F) are calculated by T0=t3−t0, T1=t1−t0, T2=t2−t0 (refers to (d)(g)(i) of FIG. 9F). The ratios of the relative timing transitions T1/T0 for V10s and T2/T0 for V20s are the phases of the captured squarewave signals V10s and V20s relative to reference driving signal V1. The phases of two signals V10s and V20s (or angular positions of the rotating part) can be calculated from formulas θ1=T1/T0*360 for V10s and θ2=T2/T0*360 for V20s which is the degree as a unit of phase.

Figure 9H:
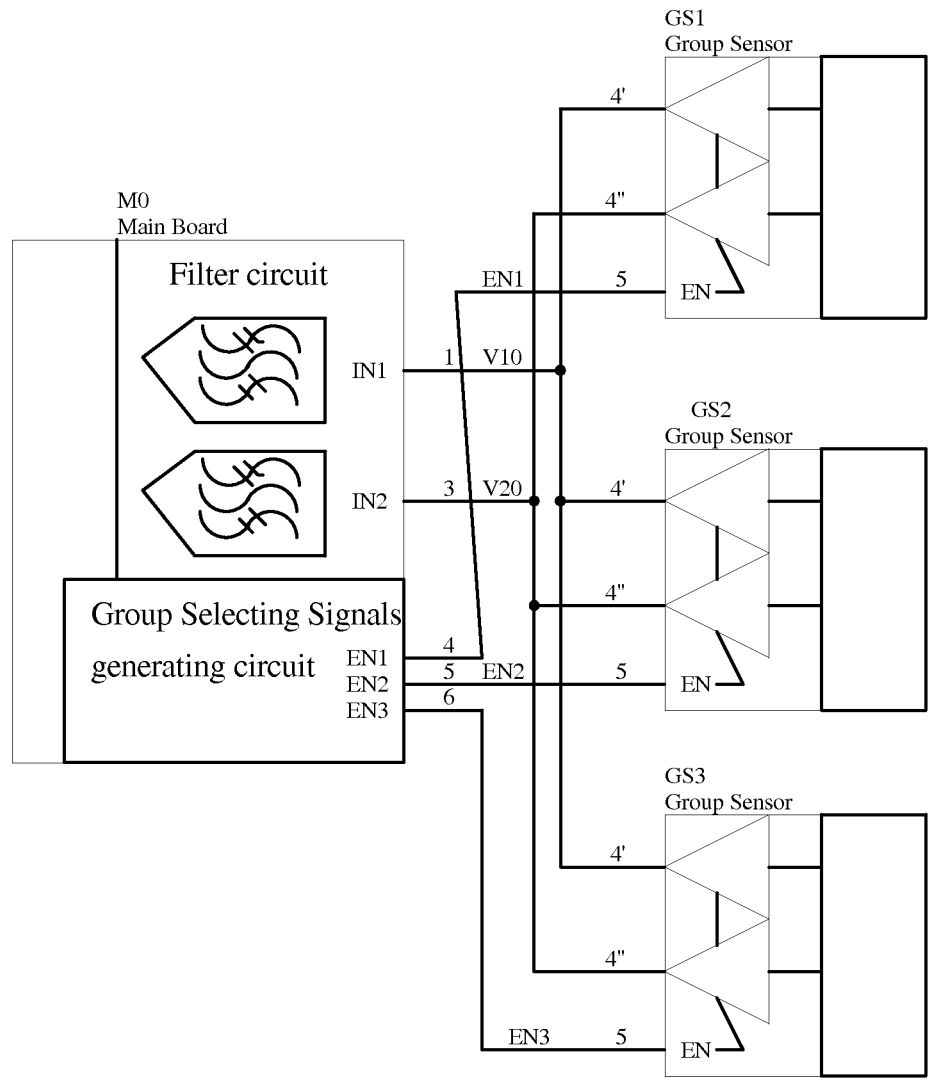
FIG. 9H is a System Connection Schematic Diagram of FIG. 1A.

FIG. 9H shows a system connection for routing the signals of the Group Sensors where each of output sensing signals V10 and V20 of the Group Sensors is connected together and then connected to the filter inputs (IN1 or IN2) of the Signal Processing Module of Main Board M0 respectively. Each of three Group Selecting Signals EN1, En2 and EN3 controls a Group Sensor (GS1, GS2 or GS3) for enabling or disabling the respective outputs (V10 and V20) of the circuit FIG. 9B. When Group Selecting Signals (EN1, EN2, EN3)=(1,0,0), group sensor GS1 is enabled; when (EN1, EN2, EN3)=(0,1, 0), group sensor is GS2 enabled; when (EN1, EN2, EN3)= (0,0,1), group sensor GS1 is enabled. Only one Group Sensor is enabled each time and only the enabled Group Sensor send its sensor signals V10 and V20 to the Main Board to process; other Group Sensors lie in a high impedance state.

Figures 9I, 9J:
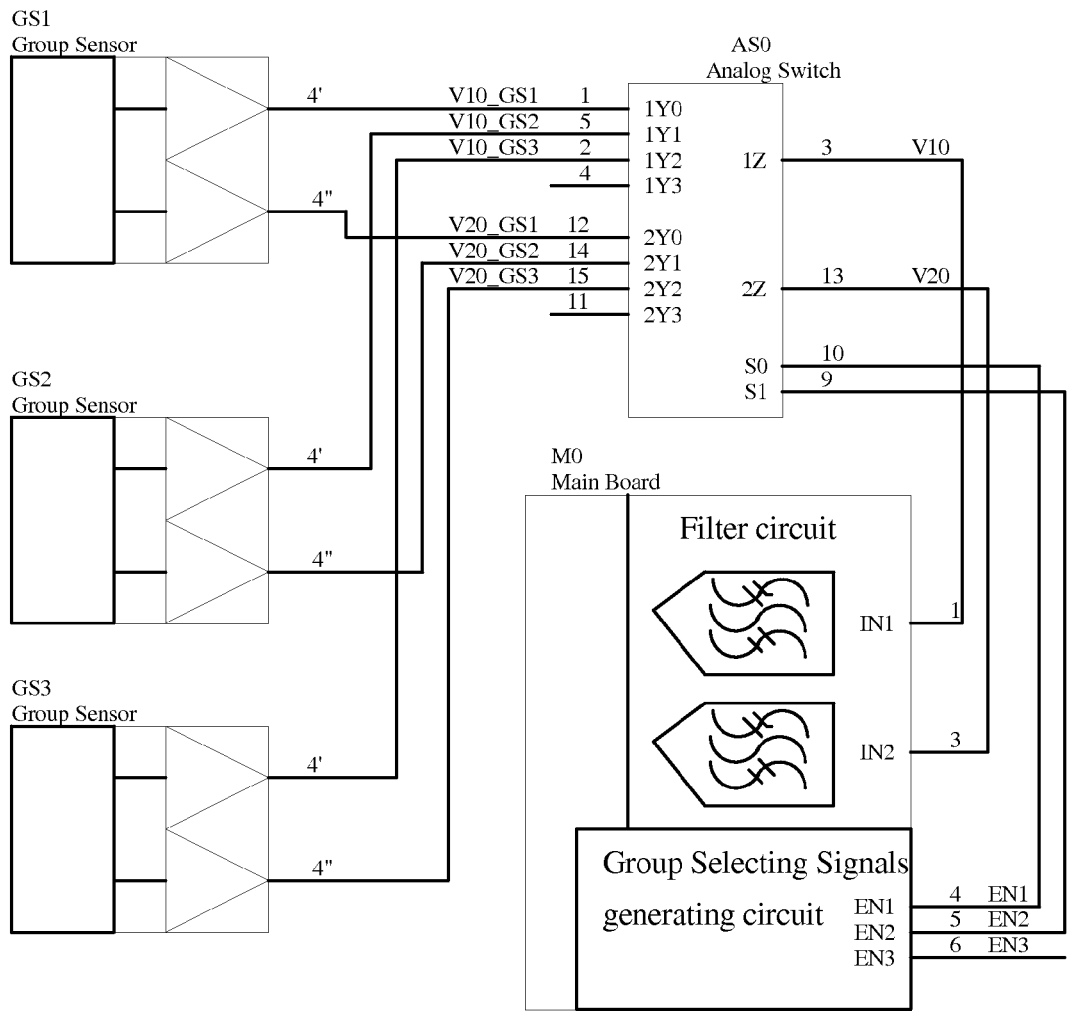
FIG. 9I is a System Connection Schematic Diagram of FIG. 1A with an analog switch circuit to control the Group Sensor Signals.
FIG. 9J is the truth table for the signals of analog switch of FIG. 9I.

FIG. 9I shows another system connection for routing the group signals where the output signals (V10_GS1 to V10_GS3) and (V20_GS1 to V20_GS3) of the Group Sensors are connected to the respective input of analog switch circuit AS0 and then two outputs of the analog switch are connected to the respective two filter inputs of the Signal Processing Module of the Main Board. Group Selecting Signals EN1, En2 (EN3 unconnected) control the internal connections of the analog switch. A Analog Switch Truth Table of FIG. 9J shows the relations of Group Selecting Signals EN1 and EN2 and output signals (V10_GS1 to V10_GS3) and (V20_GS1 to V20_GS3); when (EN1, EN2)=(0.0), the signals V10_GS1 and V20_GS_1 of Group Sensor GS1 are switch to the outputs of AS0; when (EN1, EN2)=(1.0), the signals V10_GS2 and V20_GS2 of Group Sensor GS2 are switched the output of AS0; when (EN1, EN2)=(0.1), the signals V10_GS3 and V20_GS3 of Group Sensors GS3 are switched to the output of AS0. Only the Group Sensor which the signals switched to the outputs the AS0 is activated and the signals are sent to the filter inputs of the Main Board to process as shown in FIG. 9I.

A RFID Data Transmitting Circuit U1 is provided on the Main Board of FIG. 9A for wirelessly exchanging information with a reader station outside of the meter and handling the communication signals of antenna, which includes a modulating/demodulating (MODEM) circuits, a coding/decoding circuits (CODEC), an EEPROM used to store the meter calibration data and/or the customer information, and a SPI interface circuit connected to a Microcontroller U0 for exchanging information therebetween. The Microcontroller is used to control the data acquisition process of the sensors and interpret the commands which sent from the RFID circuit. Several signal lines are also provided between the Microcontroller and the RFID circuit for handshaking and trigging interrupts purpose which are not shown in the Figure The power of the meter is generated from the energy of the electromagnetic wave of the signals that coupled from the reader station outside of the meter by rectifying the resonant signals received by the Antenna circuit L0C0 of FIG. 9A. A power management circuit is provided inside of U1 to optimize the power of the meter and provide a regulated voltage for the meter system. A big value capacitor C1 of FIG. 9A is charged by the power management circuit at a maximum possible changing rate; the accumulated energy of C1 is further regulated by a Power Supply Circuit U3, and the output of U3 is used as the power of the meter system. The averaging power consumption of the meter system is only a fraction of milliwatts and the duration of the meter data reading is only several hundreds milliseconds for a cycle of meter data reading of the reader station. The RFID circuit used in the example is TMS37157, "A PASSIVE LOW FREQUENCY INTERFACE DEVICE WITH EEPROM FROM TI INSTRUMENTS". The other RFID circuit or low power RF circuits can also be used to perform the same functions as the RFID circuit which is used in the example here.

Figure 10A:
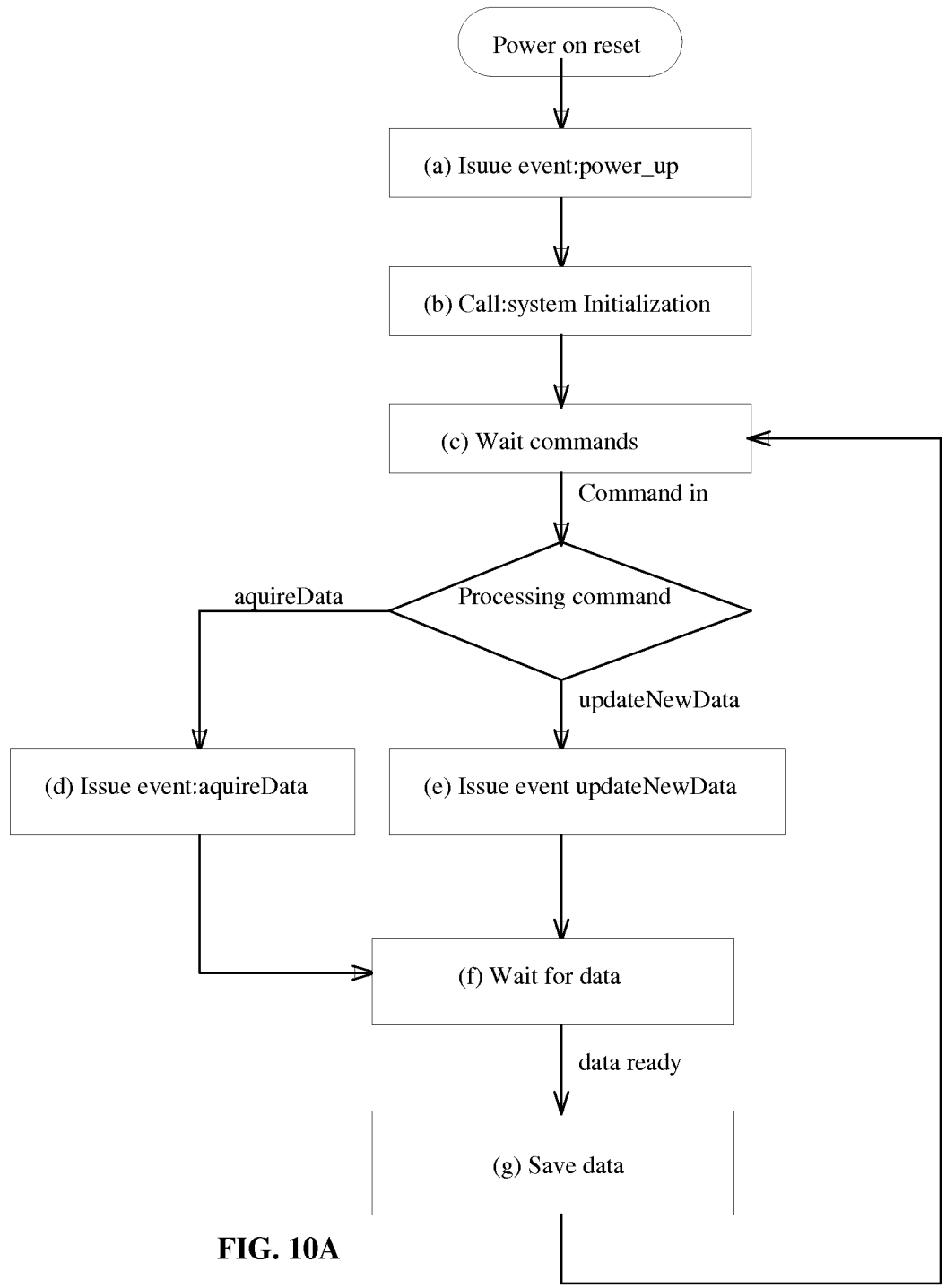
FIG. 10A is a Main Program Flowchart of the software running on Microcontroller U0 of FIG. 9A.
Figure 10B:
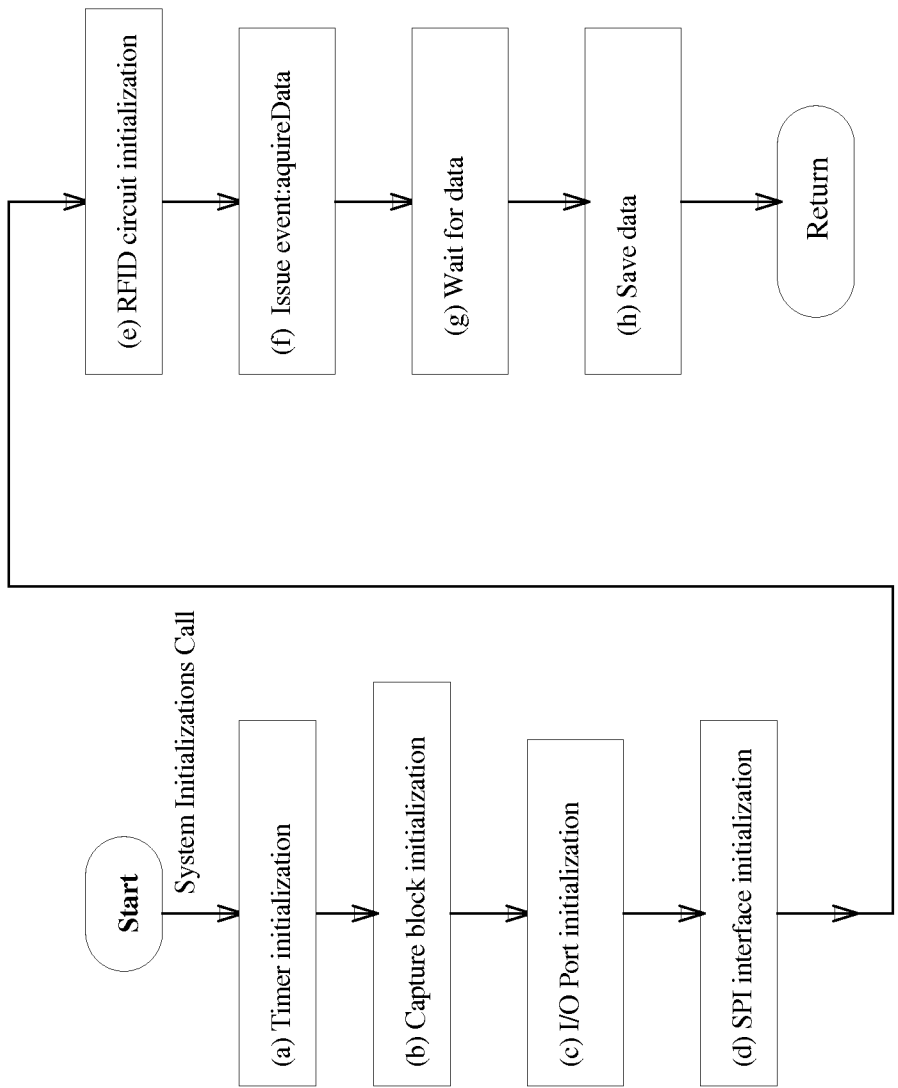
FIG. 10B is a System Initialization Subroutine Flowchart which called by the Main Program shown in FIG. 10A.
Figure 10C:
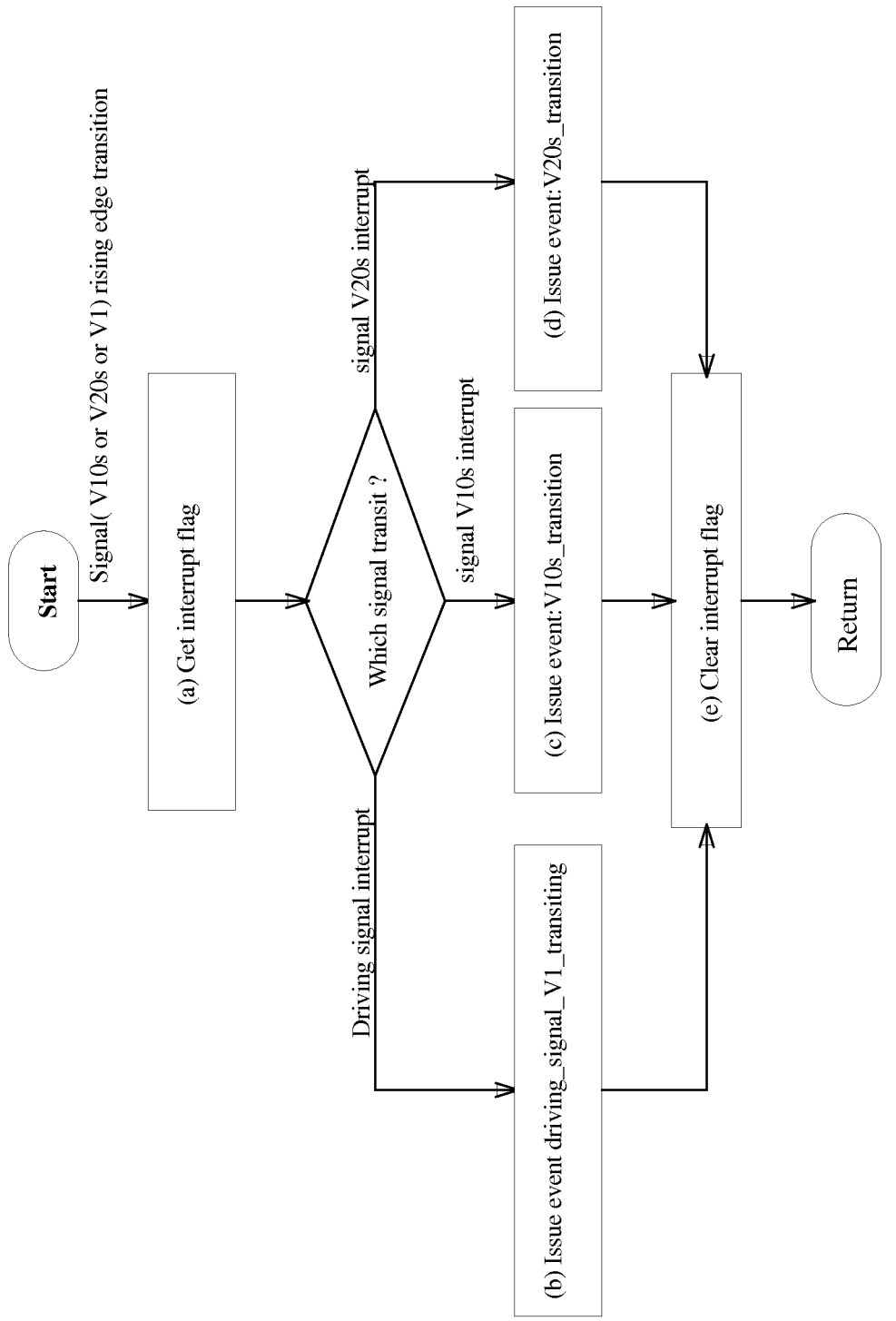
FIG. 10C is a Capture Interrupt Service Routine Flowchart for serving the capture signals interrupts of FIG. 9E.
Figure 10D:
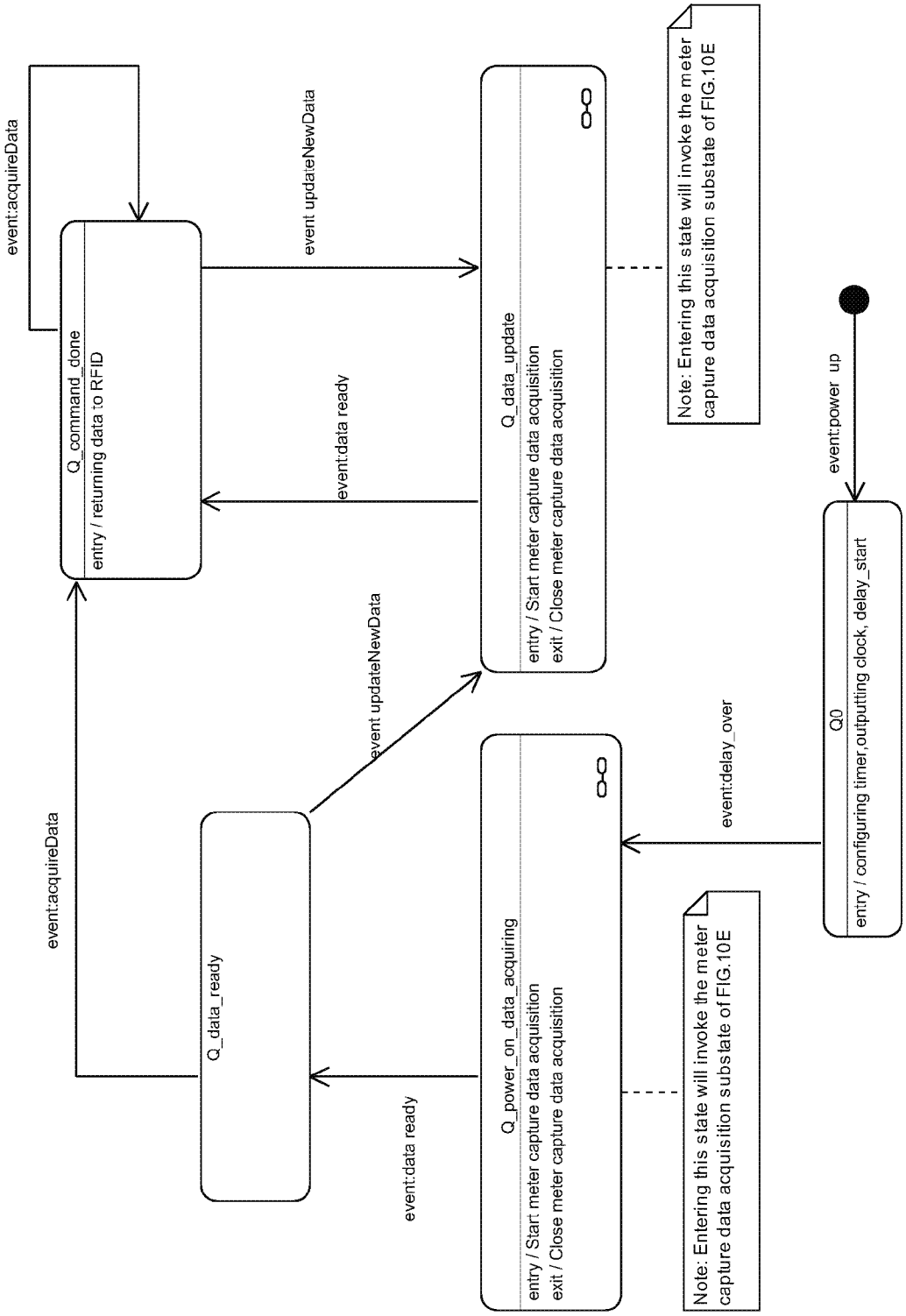
FIG. 10D is a Control State Machine Diagram for responding the commands of the Main Program shown in FIG. 10A.
Figure 10E:
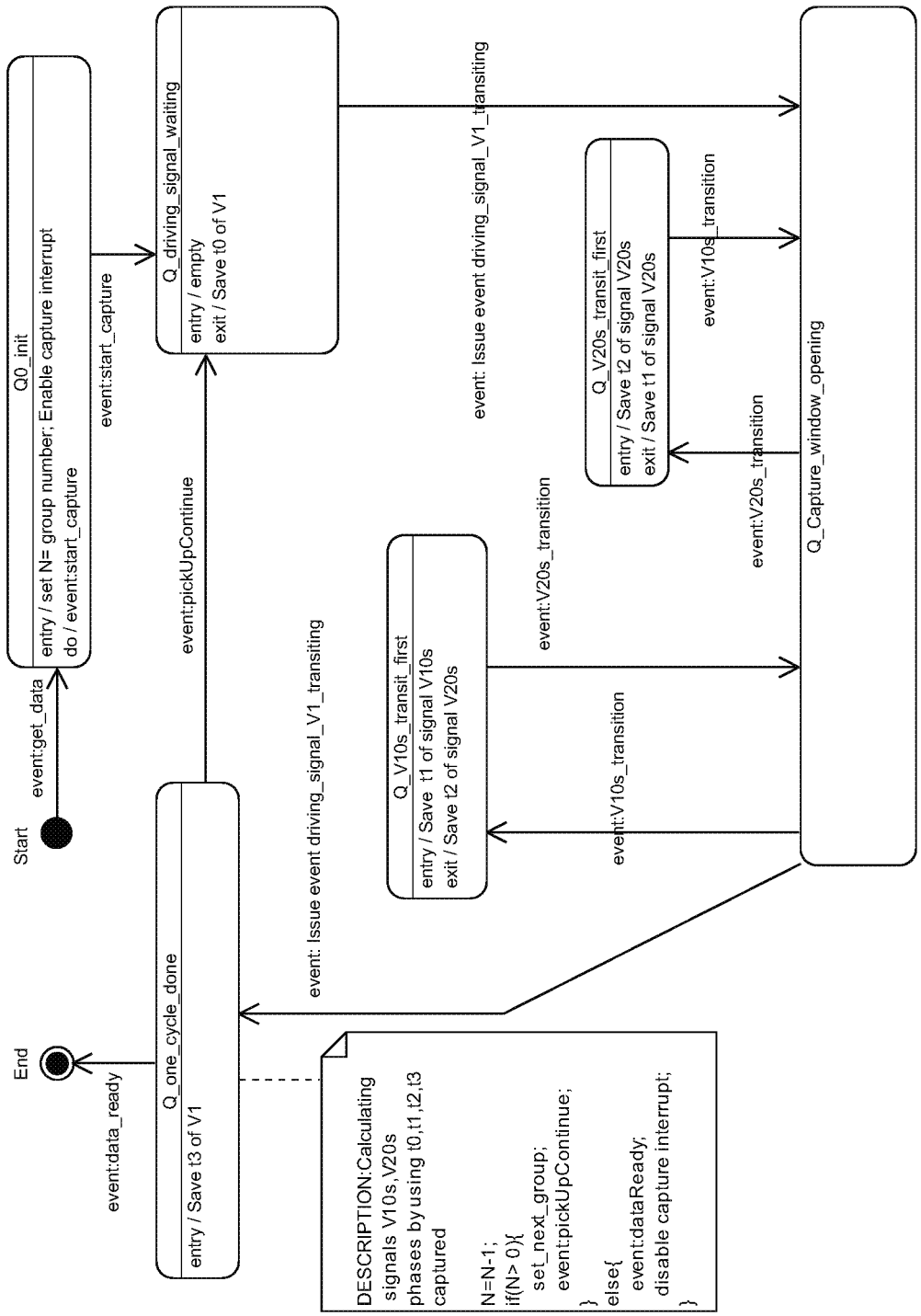
FIG. 10E is a Substate Machine Diagram of the Control State Machine FIG. 10D for the meter data acquisition.

FIG. 10A is a Main Program Flowchart used to control the system works that runs on Microcontroller U0 of FIG. 9A; FIG. 10B is a subroutine of System Initializations which is called by the Main Program; FIG. 10C is an Interrupt Service Routine Flowchart for responding the capture signal interrupts of the Capture Block of FIG. 9E; FIG. 10D is a Control State Machine Diagram of the software for handling the system events, performing the meter data acquisitions and responding to the commands of the Main Program which sent from the RFID circuit; FIG. 10E is a Meter Data Acquisition State Machine using for meter data acquisition and being invoked by the Control State Machine Diagram of FIG. 10D; FIG. 10D runs in the background of the Main Program after power up and invoked by the Main Program.

The Meter Data Acquisition State Machine FIG. 10E is invoked whenever the meter data reading required. The first Meter Data Acquisition is invoked by the System Initialization Subroutine FIG. 10B at the end of hardware initializations during power up phase as shown in (f) (g) (h) of FIG. 10B. After power up, the Meter Data Acquisition State Machine is trigged for the data acquisition of the Group Sensors by the events from the Interrupt Service Routine FIG. 10C.

FIG. 10C is an Interrupt Service Routine for serving the interrupts of reference driving signal V1, V10s and V20s and works with the Meter Data Acquisition State Machine FIG. 10E to handle the interrupt signals. When an interrupt occur, the first step is to identify the source of interrupt by reading the interrupt flags (not shown), if the interrupt source is driving signal V1, then issuing a driving_signal_V1_transiting event as shown in (b) of FIG. 10C; if the source is V10s, then issuing a V10s_transition event as shown in (c); if the source is V20s, issuing a V20s_transition event as shown in (d); the last step is to clear the interrupt flags for preparing the next interrupt as shown in (e).

Again reference to the Capture Block of FIG. 9E, Capture Timing Waveforms FIG. 9F, Capture Interrupt Service Routine FIG. 10C, and Meter Data Acquisition State Machine FIG. 10E, the state transitions of the Control State Machine Diagram FIG. 10D are triggered by the events of commands in Main Program FIG. 10A when commands sent from RFID and received by the Microcontroller; the state entry actions of states Q_power_on_data_acquiring and Q_data_update of FIG. 10D initialize and invoke the initial state transition of FIG. 10E; the Capture Interrupt Service Routine of FIG. 10C services the interrupts of the Capture Block issuing events to control the further process of the state transitions of FIG. 10E for capturing Timing t0 to t3 of each Group sensor. FIG. 9F shows the detail waveforms of each captured signals. FIG. 10D includes two states Q_power_on_data_acquiring and Q_data_update, the entry action of the two states invokes the Meter Data Acquisition State Machine. State Q_power_on_data_acquiring is entered only one time after power up; but state Q_data_update is used to handle the incoming commands after first meter data acquisition of Q_power_on_data_acquiring, it is invoked whenever meter data acquisition needed after power up.

The programming of the software shown in FIGS. 10A to 10E are based on the event programming technology using event trigging to invoke the respective thread program running. The Microcontroller works in power down mode for saving power purpose after system initializations. The program is invoked to run only when the interrupts or events received. The Microcontroller which used in the example is the "Texas Instrument MSP430x22x4 16-bit Ultra-Low-Power Microcontroller", other type of microcontrollers can also be used such as the "extreme Low Power PIC Microcontrollers XLP family PIC18F46J50" depends upon the applications and the development tools which you familiar with.

Still reference to FIG. 10A, a power_up event (refers to (a)) is issued at the start of the program which invokes the Control State Machine FIG. 10D to transit from an Initial State (the solid dot) to Q0, the entry actions of Q0 are configuring timer, outputting clock signal and then delaying a period of time for stabilizing the signals of the sensors. At the period of waiting for the event of delay_over, the Main Program of FIG. 10A continues to run and calls the System Initialization Subroutine where to do: (a) Timer initialization, (b) Capture block initialization, (c) I/O port initialization, (d) SPI interface initialization and (e) RFID circuit initialization as shown in FIG. 10B. After the System Initializations, the program enters a power down mode and waiting for the events of the commands (refers to (c) of FIG. 10A).

Again reference to FIG. 10D, after a period of time delay, a delay_over event issued by a delay timer interrupt (not shown), which makes a state transition from Q0 to a state Q_power_on_data_acquiring. The state Q_power_on_data_acquiring is a substate performing the Meter Data Acquisition as shown in FIG. 10E as has been described. After meter data reading of the substate of the Meter Data Acquisition done, the results of the meter data reading is saved, and the state enters a new state Q_data_ready by a data_ready event which issued in the substate of the Meter Data Acquisition after the meter data acquisition is done. The further state transition depends on the acquireData event or updateNewData event issued by the Main Program (refers to FIG. 10A) when the respective command received from RFID. When an acquireData command received, an acquireData event will be issued as shown in (d) of FIG. 10A which triggering a transition from Q_data_ready to Q_command_done and an action of returning previous saved data (meter reading) to RFID will be performed in the entry action of Q_command_done; When an updateNewData command received, an updateNewData event will be issued (shown in (e) of FIG. 10A), which triggering a transition from Q_data_ready to Q_data_update and a new Meter Data Acquisition action will be performed again; after the meter data acquisition is done, a data_ready event causes a state transition from the state of Q_data_update to Q_command_done as shown in FIG. 10D and returns the new data (meter reading) to the RFID in the entry action of the state Q_command_done.

As has been described above, the Meter Data Acquisition of FIG. 10E is entered whenever a meter data reading needed. The state transition controls the process of the angular position data acquisition of the Group Sensors in a group by group manner. The entry action of Q0_init performs the initialization works for Capture Block which set capture parameter (group numbers N), enables interrupts of capture channels, and then transits to the state Q_driving_signal_waiting by issuing a start_capture event at the end of initializations. The paths of the state transitions from state Q_driving_signal_waiting to state Q_one_cycle_done is a Data Acquisition Cycle T0 (refers to FIG. 9D) of the Group Sensors which including the Parameters of the Timing t0 to t3 as shown in FIG. 9D. Each parameter is captured by a respective one of capture channels of FIG. 9E and the Capture Timing Waveforms are shown in FIG. 9F. Timing t0 captured by Capture Register U01 of FIG. 9E and saved in the exit action of the Q_driving_signal_waiting; timing t3 also captured by Capture Register U01 of FIG. 9E but saved in entry actions of state Q_one_cycle_done which transited from state Q_Capture_window_opening at an event of driving_signal_transiting trigged by V1; timing t1 and t2 are captured by the respective Capture Registers U02 and U03 of FIG. 9E between the time t0 and t3 and saved during the entry action and exit action of the state transitions to either Q_V10s_transit_first or Q_V20s_transit_first depending on which signal (V10s or V20s) comes first. After a cycle of data acquisition of the Group Sensors is done, two signal phases of V10s and V20s can be derived from T0, T1 and T2 which calculated from captured timings t0 to t3. The phases of two signals V10s and V20s (or angular positions of the rotating part of each Group Sensors) are calculated from formulas θ1=T1/T0*360 for V10s and θ2=T2/T0*360 for V20s as has been mentioned before. After the data acquisition of the first Group Sensors processed and the phases calculated, the second group enabled by generating a new Group Selecting Signals EN1, EN2 and EN3 (enabling EN2 and disabling the other two EN1, EN3); by generating a pickUpContinue event, a new data acquisition cycle for the second Group Sensors, which same as the cycle of the data acquisition of the first Group Sensors, is started in state Q_driving_signal_waiting; after the data acquisition of the second Group Sensors is done, then the data acquisition cycle for the third group, by enabling EN3 and disabling the other two EN1, EN2 signals. After finishing all three group data acquisition, a data_ready event issued to show the data of the meter reading is ready at the transition to final state as shown in FIG. 10E. The data ready event triggers the state transition of FIG. 10D which invokes the data processing returning meter data reading to RFID. The above meter data reading process (Meter Data Acquisition State Machine FIG. 10E) is invoked only when the meter reading required.

The RFID circuit U1 shown in FIG. 9A handles the wireless coupling and the process of data coding and decoding providing a transparent interface between Microcontroller U0 and the reader station (not shown) outside of the meter. When a command is transmitted from the reader station and demodulated by RFID circuit, the RFID interrupts Microcontroller U0 to show a new command coming in. The Microcontroller is awaken up and started to read the command from RFID through SPI interface; after the command being received, the Microcontroller analysis the command and carries the command. If the command is aquireData, a saved meter data is returned to the RFID circuit immediately by the Microcontroller; if the command is updateNewData, the Meter Data Acquisition State Machine of FIG. 10E is invoked by a new transition of Control State Machine shown in FIG. 10D to update the meter data first and then return the data to the RFID after the meter data acquisition done. After RFID receiving the meter data, RFID encodes and modulates the data and then transmits back to the reader station. The whole process is controlled by the Control State Machine Diagram of FIG. 10D There is another issue to implement the sensor, which is about the interferences. Two types of the interferences influences the measurement signals, one is from the outside of the meter and the other from inside itself. Both types of the interferences are generally prevented by using the technique of shielding. What we discussed here is the inside interferences only which the one related to the structure of the embodiments. The source of the driving signals on the transmitting electrodes is a major source of the inside interferences to the output sensing signals on the output electrode inside of the sensor. To prevent the unwanted coupling of the transmitting electrodes to the output electrode, a shielding electrode is generally placed therebetween for decoupling the interferences. FIGS. 11A to 11D show the implementations of shielding electrodes $1x$_ES (x=a, b, c, d represents four embodiments), where $1x$_ES is arranged between the transmitting electrodes $1x$_E1 and the output electrode $1x$_E2 and connected to the circuit ground (not shown) to decouple the interferences of the electric fields of the transmitting electrodes to the output electrode. FIG. 11A shows two conical-frustum-shaped electrodes $1a$_E1 and $1a$_E2 with a V shape shielding electrode $1a$_ES placed therebetween; FIG. 11B shows two cylinder-shaped electrodes $1b$_E1 and $1b$_E2 with a same shape shielding electrode $1b$_ES placed therebetween; FIG. 11C shows two plane-ring-shaped electrodes $1c$_E1 and $1c$_E2 with a same shape shielding electrode $1c$_ES placed therebetween, and the last one, FIG. 12D shows a cylinder-shaped output electrode $1d$_E2 and eight pieces of plan transmitting electrodes $1d$_E1 with a cylinder-shaped shielding electrode $1d$_ES placed therebetween.

Note: FIGS. 11A to 11D show the shielding electrodes and the fixed electrodes of the four embodiments only, the rotating electrodes are not shown in the Figures.

As have been shown in FIGS. 8A to 8D, a Group Sensor is constructed by mounting two opposite positioned sensors with a piece of PCB sandwiched therebetween. FIGS. 12A to 12D physically show the structures of the fixed electrodes of the Group Sensor of FIG. 8D by referring the respective four embodiments of FIGS. 11A to 11D, where two fixed parts $1x'$ and $1x''$ (x=a, b, c, d as is mentioned above) are mounted on the two surfaces of PCB with the axis of the relevant electrodes of the sensors aligned to each other. The fixed part of each of the two opposite positioned sensors includes two types of electrodes; one is for applying the driving signals including eight transmitting electrodes, and another for picking up the sensing signals including an output electrode. To prevent the signal interferences coupled between the two types of the electrodes, an extra electrode-shielding electrode is introduced for each of the four embodiments of the sensors.

The fixed parts shown in FIGS. 12A to 12D are logically constructed by 1x', 1x'' and PCB. Physically, the three parts can be either molded into one piece or separately made and assembled together later. In the example of the invention, the three parts are made separately, the base material of the part 1x' and part 1x'' is the ceramic with the electrodes electric plated thereto; other insulating materials, e.g. thermosetting plastic, for making the base are also suitable; PCB is a general circuit board used in the electronic devices with two copper layers (not shown) on the surfaces, two parts 1x' and 1x'' are soldered on the respective copper layers with the shielding electrodes. There are some other methods used to make the part, e.g. modeling three parts together into one and then coating the electrodes on the respective surfaces by electric plating method.

FIG. 13A to 13C show the whole structures of a Group Sensor with a type of electrodes of FIG. 12D, where two rotating parts 2d' and 2d'' with a common fixed part placed therebetween as shown in FIG. 13C, the common fixed part includes two logical parts 1d' and 1d'' with a PCB sandwiched therebetween. FIG. 13A and FIG. 13B show the detailed structures of the electrodes of the sensors. The fixed part (including 1d', PCB and 2d'') comprise the following electrodes:

transmitting electrodes 1d'_E1 and 1d''_E1 which secured to the respective disk-shaped surfaces of PCB; and two output electrodes 1d'_E2 and 1d''_E2 which secured to the respective cylindrical surfaces of parts 1d' and 1d''; and two shielding electrodes 1d'_ES and 1d''_ES which secured to the respective inner surface of parts 1d' and 1d'';

a Group Signal Connector P0 also provided on a surface of PCB for transmitting signals to and from the Main Board.

The two rotating parts (2d' and 2d'') comprise the following electrodes:

two receiving electrodes 2d'_E1 and 2d''_E1 which secured to the respective disk-shaped surfaces; and two coupling electrodes 2d'_E2 and 2d''_E2 which secured to the respective cylindrical surface; and two conductors to connect the respective receiving electrode and the coupling electrode which are not shown in the Figures.

As can be seen in FIG. 13A, to reduce the length of driving signal traces and interferences therefrom, the transmitting electrodes (1d'_E1 and 1d''_E1) of the two sensors are connected directly by eight conductors which designated with 1d_C without needing the extra trace(s) therebetween. Another difference of this structure from the other three is that each of output electrodes 1d'_E2 and 1d''_E2 being arranged on the respective outside of transmitting electrodes 1d'_E1 and 1d''_E1, so that the inputs of amplifiers U10 and U20 (U20 on the back surface of PCB) can directly (in shortest way) connect to the respective output electrodes without needing to route the signal trace to the middle layer of board, with which the Vias (holes for connecting traces of deferent PCB layers) of the traces are eliminated and the noise of interferences is then being reduced.

Figure 1C:
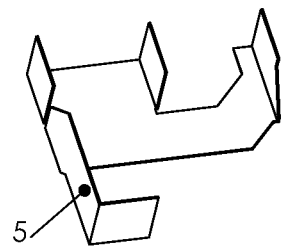
FIG. 1C is an isometric view of a FPC cable of FIG. 1A.

| REFERENCE NUMERALS | |
|---|---|
| FIGS. 1A to 1C: | |
| 1 fixed part of the Group Sensors | 2' rotating part-left |
| 2'' rotating part-right | 4 shaft |
| 5 flex printed cable (FPC) | 10 meter assembly |
| 22 antenna assembly | |
| GS1 Group Sensor one | GS2 Group Sensor two |
| GS3 Group Sensor three | M0 Main Board |
| PCB printed circuit board of the fixed part | P1 FPC connector of the Main Board |
| U0 Microcontroller | U1 RFID circuit |
| U2 filter circuit | U3 Power Supply Circuit |
| U4 Driving Signal Circuit | U5 Comparator Circuit |
| U10 sensing signal amplifiers-channel one | U20 sensing signal amplifiers-channel two |
| FIGS. 2A to 2G: | |
| 1P polygon one | 2P polygon two |
| A axis of parts | |
| L11 line one of polygon one | L12 line two of polygon one |
| L21 line one of polygon two | L22 line two of polygon two |
| 1 fixed part -base | 2 rotating part -base |
| 1S1 working surface one of part one | 2S1 working surface one of part two |
| 1S2 working surface two of part one | 2S2 working surface two of part two |
| α opening angle alpha | β opening angle beta |
| FIG. 3 to FIG. 7: | |
| 1a part one -first embodiment | 2a part two -first embodiment |
| 1a_E1 transmitting electrodes of 1a | 2a_E1 receiving electrode of 2a |
| 1a_E2 output electrode of 1a | 2a_E2 coupling electrode of 2a |
| 1b part one -first embodiment | 2b part two -second embodiment |
| 1b_E1 transmitting electrodes of 1b | 2b_E1 receiving electrode of 2b |
| 1b_E2 output electrode of 2b | 2b_E2 coupling electrode of 2b |
| 1c part one -third embodiment | 2c part two -third embodiment |
| 1c_E1 transmitting electrodes of 1c | 2c_E1 receiving electrode of 2c |
| 1c_E2 output electrode of 1c | 2c_E2 coupling electrode of 2c |
| 1d part one -fourth embodiment | 2d part two -fourth embodiment |
| 1d_E1 transmitting electrodes of 1d | 2d_E1 receiving electrode of 2d |
| 1d_E2 output electrode of 1d | 2d_E2 coupling electrode of 2d |
| FIGS. 8A to 8C: | |
| 1' fixed part -sensor one | 2' rotating part -sensor one |
| 1'' fixed part -sensor two | 2'' rotating part -sensor two |

-continued

| REFERENCE NUMERALS |
|---|

PCB printed circuit board
P0 Group Signal Connector

FIG. 9A:

| | |
|---|---|
| A0 Antenna assembly | CLK_f0 driving clock of driving signal circuit |
| C0 antenna resonant capacitor | C1 Charging capacitor |
| CLEAR clear signal of driving signal circuit | L0 ferrite core antenna -resonant inductor |
| EN1 Group Selecting Signal LSB (least significant bit) | |
| EN2 Group Selecting Signal second bit | |
| EN3 Group Selecting Signal MSB (most significant bit) | |
| U0 Microcontroller | U1 Data Transmitting CircuitU2Filter Circuit |
| U3 Power Supply Circuit | U4 Driving Signal CircuitU5Comparator Circuit |
| P1 main connector | V1 to V8 eight equal phase driving signals |
| V10 output sensing signal-first channel | V20 output sensing signal -second channel |
| V10a filtered signal--first channel | V20a filtered signal -second channel |
| V10s squarewave signal -first channel | V20s squarewave signal -second channel |

FIG. 9B:

| | |
|---|---|
| 1~8 eight transmitting electrodes | |
| 1x_E1 transmitting electrodes | 2x_E1 receiving electrode |
| 1x_E2 output electrode | 2x_E2 coupling electrode |
| 2x_C conductor | Cc equivalent capacitor of 1x_E2 and 2x_E2 |
| EN Group Addressing Signal | EN1 Group Selecting Signal LSB |
| EN2 Group Selecting Signal second bit | EN3 Group Selecting Signal MSB |
| K0 Group Selecting Switch | P0 Group Signal Connector |
| S1 Sensor one | S2 Sensor two |
| U10 OP amplifier -channel one | U20 OP amplifier -channel two |
| V1 to V8 eight equal phase driving signals | Vc coupling signal on the receiving electrode |
| V10 output sensing signal-first channel | V20 output sensing signal -second channel |
| Vs1 output sensing signals -channel one | Vs2 output sensing signals -channel two |

FIGS. 9D to 9F:

| | |
|---|---|
| CLR Start Clear Signal | V1 referencing driving signal |
| V10s squarewave signal -first channel | V20s squarewave signal -second channel |
| U01 Capture Register | U02 Capture Register |
| U03 Capture Register | |
| t0 start time of driving signal V1t1 transition time of V10s | |
| t2 transition time of V20s | t3 end cycle transition of reference signal V1 |
| T0 signal cycle | T1 relative timing transition of V10s |
| T2 relative timing transition of V20s | |

FIG. 9H:

| | |
|---|---|
| M0 Main Board | |
| EN1 Group Selecting Signal LSB | EN2 Group Selecting Signal second bit |
| EN3 Group Selecting Signal MSB | |
| GS1 Group Sensor one | GS2 Group Sensor two |
| GS3 Group Sensors three | |
| V10 output sensing signal-first channel | V20output sensing signal -second channel |

FIG. 9I:

| | |
|---|---|
| M0 Main Board | |
| EN1 Group Selecting Signal LSB | EN2 Group Selecting Signal second bit |
| EN3 Group Selecting Signal MSB | |
| GS1 Group Sensor one | GS2 Group Sensor two |
| GS3 Group Sensors three | |
| V10 output sensing signal-first channel | V20output sensing signal -second channel |
| AS0 Analog Switch circuit | |
| V10_GS1 output sensing signal of CS1-first channel | |
| V20_GS1 output sensing signal of CS1 -second channel | |
| V10_GS2 output sensing signal of CS3 -first channel | |
| V20_GS2 output sensing signal of CS2 -second channel | |
| V10_GS3 output sensing signal of CS3 -first channel | |
| V20_GS3 output sensing signal of CS3 -second channel | |

FIGS. 11A to 11D:

1a_E1 transmitting electrodes of the first embodiment
1a_E2 output electrode of the first embodiment
1a_ES shielding electrode of the first embodiment
1b_E1 transmitting electrodes of the second embodiment
1b_E2 output electrode of the second embodiment
1b_ES shielding electrode of the second embodiment
1c_E1 transmitting electrodes of the third embodiment
1c_E2 output electrode of the third embodiment
1c_ES shielding electrode of the third embodiment
1d_E1 transmitting electrodes of the fourth embodiment
1d_E2 output electrode of the fourth embodiment
1d_ES shielding electrode of the fourth embodiment

| REFERENCE NUMERALS |
| --- |
| FIGS. 12A to. 12D: |

PCB printed circuit board
1a fixed part of the Group Sensor -first embodiment
1a' fixed part of the left sensor -first embodiment
1a" fixed part of the right sensor -first embodiment
1b fixed part of the Group Sensor -second embodiment
1b' fixed part of the left sensor -second embodiment
1b" fixed part of the right sensor -second embodiment
1c fixed part of the Group Sensor -third embodiment
1c' fixed part of the left sensor -third embodiment
1c" fixed part of the right sensor -third embodiment
1d fixed part of the Group Sensor -fourth embodiment
1d' fixed part of the left sensor -fourth embodiment
1d" fixed part of the right sensor -fourth embodiment

| FIG. 13A to 13C: |
| --- |

PCB printed circuit board
1d' fixed part of the left sensor -fourth embodiment
1d'_ES' shielding electrode of the left sensor -fourth embodiment

| | |
| --- | --- |
| 1d'_E1 transmitting electrodes of 1d' | 2d'_E1 receiving electrode of 2d' |
| 1d'_E2 output electrode of 1d' | 2d'_E2 coupling electrode of 2d' |
| 2d'_E1 receiving electrode of 2d' | 2d'_E2 coupling electrode of 2d' |

1d" fixed part of the left sensor -fourth embodiment
1d"_ES' shielding electrode of the left sensor -fourth embodiment

| | |
| --- | --- |
| 1d"_E1 transmitting electrodes of 1d" | 2d"_E1 receiving electrode of 2d" |
| 1d"_E2 output electrode of 1d" | 2d"_E2 coupling electrode of 2d" |
| 2d"_E1 receiving electrode of 2d" | 2d"_E2 coupling electrode of 2d" |
| U10 sensing signal amplifiers-channel one | U20 sensing signal amplifiers-channel two |
| P0 Group Signal Connector | 1d_C connector of the transmitting electrodes of 1d" and 2" |

The invention claimed is:

1. An apparatus for visually and remotely determining an angular position of a relative rotation of parts as it rotates about an axis comprising:

first and second relatively rotatable parts, one is fixed as a fixed part, another, relatively rotatable one, rotated about an axis as a rotating part, each of said parts having two working surfaces which geometrically generated by rotating a two-dimensional polygon about said axis, said two-dimensional polygon parallel to said axis but not intersect said axis; one of two working surfaces is for sensing position purpose called sensing surface, another is for coupling sensing signals called coupling surface; each of said two working surfaces of one of said parts is equispaced from, and lies closely adjacent to, a respective one of said two working surfaces of another one of said parts; each of said two working surfaces of one part forms a working surface pair with a respective one of said two working surfaces of another part, one of the formed two working surface pairs is sensing surface pair, another is coupling surface pair;

said sensing surface of said fixed part having secured thereto a plurality of transmitting electrodes and a respective one of said rotating part having secured thereto a receiving electrode; said coupling surface of said fixed part having secured thereto an output electrode and the respective one of said rotating part having secured thereto a coupling electrode which connected to said receiving electrode of said rotating part with a conductor;

said plurality of transmitting electrodes on said sensing surface of said fixed part being positioned in confronting, spaced relation to, but in no way mechanically or electrically connected to said receiving electrode on said sensing surfaces of said rotating part within any rotatable positions of said rotating part, other than that said receiving electrode is capacitive coupled to a portion of said plurality of transmitting electrodes;

said output electrode on said coupling surface of said fixed part being positioned in confronting, spaced relation to, but in no way mechanically or electrically connected to said coupling electrode on said coupling surface of said rotating part other than that said output electrode is capacitive coupled to said coupling electrode;

means for mounting said fixed and rotating parts for relative rotational movement so as to cause said receiving electrode secured to the sensing surface of said rotating part to move along a predetermined path relative to said plurality of transmitting electrodes, a capacitive coupling between said receiving electrode and said plurality of transmitting electrodes being dependent on a relative rotational position of said parts and said electrodes;

a source of n phase polyphase squarewave voltages being supplied to said plurality of transmitting electrodes, said n equal to the number of said plurality of transmitting electrodes, successive ones of said transmitting electrodes being connected to successive said polyphase squarewave voltages; the capacitive coupling between said transmitting electrodes and said receiving electrode inducing a coupling signal on said receiving electrode, said coupling signal providing only one electrical cycle per complete mechanical rotation of said relatively rotatable parts; said coupling signal received by said coupling electrode and coupled to said output electrode with an output sensing signal produced thereon.

2. Apparatus according to claim 1 wherein said two working surfaces of each part, each of which is in a shape of frustum of right circular cone having an opening angle of said right circular cone, which is a vertex angle made by a cross section through an apex and center of a base, said opening angle lies between 0 degree and 180 degree, whereby a 0 degree of said opening angle forms a cylindrical working surface; a 180 degrees of said opening angle forms a disk shape working surface, and an angle of said opening angle between 0 and 180 degrees forms a conical frustum surface.

3. Apparatus according to claim 2 wherein said opening angles of said two working surfaces of each part are substantially independent of each other and the opening angles of the two working surfaces of each working surface pair are substantially equal to each other.

4. Apparatus according to claim 3 wherein said plurality of transmitting electrodes comprises at least three geometric pattern electrodes which are shaped to conform to said sensing surface of said fixed part along its circumference, each is equiangular spacing between a radially extending portions of said transmitting electrode, whereby a polyphase electric field corresponding to said polyphase squarewave voltages is generated by said polyphase squarewave voltages around circumstantial path of said receiving electrode.

5. Apparatus according to claim 4 wherein said receiving electrode is a certain arc length, generally a 180 degrees semicircle, conductor which shaped to conform to a portion of said sensing surface of said rotating part for rotation therewith to sense a portion of said polyphase electric field, an electric field vector underneath said receiving electrode determining the angular position of said receiving electrode.

6. Apparatus according to claim 5 wherein said arc length of said receiving electrode is from one and half times of the radially extending portion of said transmitting electrode to the number of said transmitting electrodes minus one and half times of the radially extending portion of said transmitting electrode.

7. Apparatus according to claim 3 wherein said coupling electrode is a ring shape electrode which shaped to conform to said coupling surface of rotating part for rotation therewith and connected to said receiving electrode for receiving said coupling signal thereon.

8. Apparatus according to claim 7 wherein said output electrode is a ring shape electrode which shaped to conform to said coupling surface of fixed part to form a coupling capacitor with said coupling electrode for coupling said coupling signal thereon through said coupling capacitor and producing said output sensing signal.

9. Apparatus according to claim 1 wherein said apparatus further including a sensing signal amplifier circuit with an input connected to said output electrode for amplifying said output sensing signal for producing a low output impedance position sensing signal.

10. Apparatus according to claim 9 wherein said apparatus said sensing signal amplifier circuit further including an output control terminal for controlling the output of said low output impedance position sensing signal.

11. Apparatus according to claim 1 wherein each said electrode comprising a conductor pattern constituted by an electrically conductive layer secured to the relevant said surface.

12. Apparatus according to claim 11 wherein each conductive layer comprising a printed circuit.

13. A method of determining an angular position of a relative rotatable parts, said method comprising:

providing an angular position sensor comprising:

two working surface pairs, one is sensing pair, another is coupling pair, each working surface pair having a fixed working surface on a fixed part and a rotatable working surface on a rotatable part, each working surface is in a frustum of right circular cone shape with an opening angle of the right circular cone, which is a vertex angle made by a cross section through an apex of a base, said opening angle lies between 0.degree. and 180.degree., and said opening angles of said two working surfaces of each part could be deferent, and said opening angles of the two working surfaces of each working surface pair are substantially equal to each other; an axis of the frustum of right circular cone is concentrically aligned with a common axis; and providing a plurality of transmitting electrodes which shaped to conform to said fixed surface of said sensing pair, along its circumference, each is equiangular spacing between a radially extending portions of said transmitting electrode, and providing a receiving electrode being shaped to conform to a portion of, generally a semicircle, of said rotatable surface of said sensing pair for rotation therewith, and providing a pair of electrodes, one is output electrode being shaped to conform to a full circle of said fixed surface of said coupling pair and aligned a center of said circle with said common axis; another is coupling electrode being shaped to conform to the full circle of said rotatable surface of said coupling pair for rotation therewith and aligned the center with said common axis to form a coupling capacitor with said output electrode; the coupling electrode connected to said receiving electrode with a conductor for receiving an electric signals thereon and coupling said electric signals to said output electrode, and an output sensing signal produced thereon; and providing a sensing signal amplifier circuit with an input connected to said output electrode for amplifying said output sensing signal to produce a low output impedance angular position sensing signal on the output;

adjusting said rotatable part along said common axis to make a respective electrodes of the rotatable surfaces to be such that said electrodes of the fixed surfaces positioned in confronting, spaced relation to, but in no way mechanically or electrically connected to the respective electrodes of said rotatable surfaces, other than that electric field coupling between the respective ones of electrodes;

providing an excitation circuit to generate polyphase squarewave voltages for driving said plurality of transmitting electrodes;

providing a Signal Processing Means including:

filter circuit with its input connected to an output of said sensing signal amplifier circuit for suppressing high order harmonic signals from said angular position sensing signal and outputting a sinewave signal, and providing a comparator circuit with its input connected to an output of said filter circuit for translating said sinewave signal to a squarewave signal; and providing a Microcontroller which including:

two capture circuits for phase detecting with the first Capture circuit connected to the output of said Signal Processing Means for capture the Transiting Time of said squarewave signal therefrom which a phase need to be determined and the second Capture circuit connected to one of said polyphase squarewave voltages which is provided from said excitation circuit for providing a Transiting Time as a referenced signal;

using said excitation circuit to generate polyphase squarewave voltages and applied to said transmitting electrodes; and delaying a certain time for stabilizing said squarewave signal, and starting said second Capture circuit to capture a first Transiting Time of said referenced signal, and waiting for first Transiting Time of said referenced signal and storing said first Transiting Time of said referenced signal after the capturing done, and starting said first Capture circuit to capture the Transiting Time of said squarewave signal which the phase need to be determined, and waiting for the Transiting Time of said squarewave signal which the phase need to be determined, and storing said Transiting Time of said squarewave signal after the capturing done, and calculating the Transiting Time difference of said squarewave signal by subtracting said first Transiting Time of said referenced signal from said Transiting Time of said squarewave-signal, and waiting for said second Capture circuit to capture second Transiting Time of said referenced signal, and storing said second Transiting Time of said referenced signal after the capturing done, and calculating a cycle of said referenced signal by subtracting said first Transiting Time of said referenced signal from said second Transiting Time of said referenced signal, and calculating the phase of said squarewave signal with said Transiting Time difference divided by said cycle of said referenced signal and multiplies of 360, a result of said phase is the angular position of said rotatable part which is the degree as a unit of rotation.

14. A method according to claim 13, wherein the frequency of said polyphase squarewave voltages lie in a range of 10 Hz to 10 KHz.

15. System for visually and remotely reading utility meters including a plurality of angular position sensors encased in a glass front housing, each of said sensors including a rotatable part or dial, rotating about an axis and visually indicating one digit of a number signifying an amount of consumption of the utility, said system comprising:

a. a driving signal means comprising an excitation circuit to generate a driving signal source of polyphase squarewave voltages which is connected to each of said plurality of angular position sensors for providing the driving signals including a digital sequential logic circuit driven by a clock source;

b. a transducer means comprising a plurality of relatively rotatable parts, each part is one of said angular position sensors; said driving signals supplied in common to each of said plurality of angular position sensors, and each sensor producing an output sensing signal independently which induced by an electric fields produced by said driving signals between the relatively rotatable parts and depended on a relative rotational positions of said two parts; said output sensing signal providing only one electrical cycle per complete mechanical rotation of said two parts;

c. a data transmitting means comprising a coupling means for exchanging information with a reader station outside of the meter wirelessly, and a SPI interface connected to a central control means for exchanging data therebetween;

d. said central control means comprising a command processing means for processing command received from said coupling means, and a signal processing means for processing said angular position signals of said sensors.

16. The system for reading utility meters according to claim 15 wherein said command processing means comprising a Microcontroller or an application-specific integrated circuit (ASIC).

17. The system for reading utility meters according to claim 15 wherein said coupling means comprising a low power short range coupled transponder for exchanging data and an EEPROM memory for residing utility information, generally including a radio frequency identification (RFID) circuit.

18. The system for reading utility meters according to claim 17 wherein said data transmitting means further including a charging circuit to draw power electromagnetically for energizing a power circuit of said system, whereby eliminating to use batteries or wires.

19. The system for reading utility meters according to claim 18 wherein said charging circuit comprising a rectifier circuit to transform the wireless signals of said meter received by said coupling means into a DC signal for charging the power circuit of the system including a high efficiency rectifier.

20. The system for reading utility meters according to claim 15 wherein said signal processing means further comprising:

a. group selecting means, including group selecting signals, each of said group selecting signals for controlling outputs of grouped sensors, the total of said plurality of angular position sensors are divided into several groups with each group have number of grouped sensors, each group is addressed by a group selecting signal which controls said outputs of said grouped sensors; said group selecting signals generally generated by an IO port of a Microcontroller, and b. a filter means having a number of filters, where the number of filters is equal to the number of said grouped sensors, for suppressing high order harmonic signals and noises signals of its input, and outputting a baseband sinewave signals only, and c. a translating means having a number of comparators, where the number of comparators is equal to the number of said filters, with each input of said comparators connected to a respective one of said outputs of said filters for converting said sinewave signal to a squarewave signal, and d. a capture digitizing means including same number of capture circuits as said comparators with each input of said capture circuits connected to a respective one of said output of said comparators for capturing a transiting time of the respective said squarewave signals which a phase need to be determined and one further Capture circuit being connected to one of said polyphase squarewave voltages which provided from said excitation circuit for capturing the transiting time of a referenced signal; said capture circuits are generally a capture function circuit block of a Microcontroller.

21. The system for reading utility meters according to claim 20 wherein the number of each grouped sensors lie in the range of 1 to the total of said angular position sensors, therefore said number lie in the range of the total of said angular position sensors down to 1 rounded away from zero accordingly.

22. The system for reading utility meters according to claim 20 wherein each of said angular position sensors further including a sensing signal amplifier circuit with its input connected to the output of said transducer means for amplifying said output sensing signal and producing a low output impedance position sensing signal therefrom, said low output impedance position sensing signal being connected to an input of said filters of filter means and processed thereby.

23. The system for reading utility meters according to claim 22 wherein said sensing signal amplifier circuit further comprising an output control terminal connected to one of said group selecting signals to control the output of said low output impedance position sensing signal.

24. The system for reading utility meters according to claim 22 wherein said transducer means further comprising an analog switch circuit having a capability to route an input signals passing said analog switch circuit to an output in a grouped manner according to the electric levels on a control terminals, each grouped inputs of said analog switch circuit connected to a grouped sensor connecting with the respective said low output impedance position sensing signals, and the number of grouped inputs is equal to the number of said low output impedance position sensing signals of the grouped sensor, whereby with each output voltages of said group selecting signals, a relevant said low output impedance position sensing signals of said grouped sensors are routed to the outputs of said analog switch circuit and sent to the inputs of said filter means to be processed.

25. The system for reading utility meters according to claim 20 wherein each of said filters comprising a band pass filter (BPF) which central frequency f0 substantially equal to the frequency of said polyphase squarewave voltages.

26. The system for reading utility meters according to claim 20 wherein each of said filters comprising a low pass filter (LPF) which cutoff frequency substantially less than two times of the frequency f0 of said polyphase squarewave voltages, but greater than f0.

\* \* \* \* \*